United States Patent
Tamir et al.

(10) Patent No.: US 9,311,110 B2
(45) Date of Patent: Apr. 12, 2016

(54) TECHNIQUES TO INITIALIZE FROM A REMOTELY ACCESSIBLE STORAGE DEVICE

(71) Applicant: Intel Corporation, Santa Clara, CA (US)

(72) Inventors: Eliezer Tamir, Bait Shemesh (IL); Prafulla Deuskar, Portland, OR (US); Phil C. Cayton, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 339 days.

(21) Appl. No.: 13/936,964

(22) Filed: Jul. 8, 2013

(65) Prior Publication Data
US 2015/0012735 A1    Jan. 8, 2015

(51) Int. Cl.
*G06F 9/44* (2006.01)
*H04L 29/08* (2006.01)
*G06F 3/06* (2006.01)

(52) U.S. Cl.
CPC ............ *G06F 9/4416* (2013.01); *G06F 3/0688* (2013.01); *G06F 9/4401* (2013.01); *H04L 67/34* (2013.01)

(58) Field of Classification Search
CPC .................................................. G06F 9/4416
See application file for complete search history.

(56) References Cited

U.S. PATENT DOCUMENTS

| 7,730,221 | B2 | 6/2010 | Diamant et al. | |
| 8,700,724 | B2* | 4/2014 | McDaniel et al. | 709/212 |
| 8,966,172 | B2* | 2/2015 | Malwankar | 711/114 |
| 2005/0071623 | A1* | 3/2005 | Goud et al. | 713/100 |
| 2008/0313364 | A1* | 12/2008 | Flynn et al. | 710/31 |

OTHER PUBLICATIONS

R. Recio et al., "A Remote Direct Memory Access Protocol Specification" (Network Working Group, Oct. 2007, https://www.ietf.org/rfc/rfc5040.txt, Accessed Jul. 28, 2015).*

* cited by examiner

*Primary Examiner* — Jaweed A Abbaszadeh
*Assistant Examiner* — Brian J Corcoran
(74) *Attorney, Agent, or Firm* — Kacvinsky Daisak Bluni PLLC

(57) ABSTRACT

Examples are disclosed for remotely initializing or booting a client or host device. In some examples, a network (NW) input/output (I/O) device coupled to a host device connects to a remote server via a NW communication link. For these examples, modules of the network I/O device establishes a control path to a non-volatile memory express (NVMe) controller maintained at the remote server using a remote direct memory access (RDMA) protocol. Properties of a storage device controlled by the NVMe controller have an RDMA service tag (STag) to indicate accessible allocated portions of the storage device. A system basic I/O system (BIOS) is capable of using the RDMA STag to access the storage device and load an operating system (OS) kernel. Also, one or more device drivers can remotely boot the host device using the RDMA STag.

20 Claims, 10 Drawing Sheets

600

```
RECEIVE, AT A NW I/O DEVICE COUPLED TO A HOST DEVICE,
ONE OR MORE PARAMETERS TO ENABLE THE NW I/O
DEVICE TO CONNECT TO A REMOTE SERVER VIA A NW
COMMUNICATION LINK
602
```

```
CONNECT TO THE REMOTE SERVER USING THE ONE OR
MORE PARAMETERS
604
```

```
ESTABLISH A CONTROL PATH TO AN NVMe CONTROLLER
MAINTAINED AT THE REMOTE SERVER USING AN RDMA
PROTOCOL
606
```

```
RECEIVE AN RDMA STag FROM THE NVMe CONTROLLER THAT
REPRESENTS AN ALLOCATED PORTION OF THE STORAGE
DEVICE THAT IS ACCESSIBLE USING THE RDMA STag, THE
ALLOCATED PORTION TO STORE AN OS KERNEL AND ONE OR
MORE DEVICE DRIVERS
608
```

```
STORE THE RDMA STag IN A NON-VOLATILE MEMORY AT THE
NETWORK I/O DEVICE THAT IS ACCESSIBLE TO A SYSTEM BIOS
FOR THE HOST DEVICE TO ENABLE THE SYSTEM BIOS TO USE
THE RDMA STag TO ACCESS THE STORAGE DEVICE AND LOAD
THE OS KERNEL AND THE ONE OR MORE DEVICE DRIVERS TO
REMOTELY BOOT THE HOST DEVICE
610
```

```
RECEIVE ONE OR MORE PARAMETERS ASSOCIATED WITH
CONNECTING TO A REMOTE CLIENT VIA A NW
COMMUNICATION LINK
1002
```

```
CONNECT TO THE REMOTE CLIENT VIA THE NETWORK
COMMUNICATION USING THE ONE OR MORE PARAMETERS
1004
```

```
ESTABLISH A CONTROL PATH BETWEEN THE REMOTE CLIENT
AND AN NVMe CONTROLLER MAINTAINED AT THE SERVER,
THE CONTROL PATH ESTABLISHED USING AN RDMA
PROTOCOL
1006
```

```
FORWARD ONE OR MORE PROPERTIES FOR A STORAGE
DEVICE CONTROLLED BY THE NVMe CONTROLLER TO THE
REMOTE CLIENT AND SEND AN RDMA STag GENERATED BY
THE NVMe CONTROLLER THAT REPRESENTS AN ALLOCATED
PORTION OF THE STORAGE DEVICE THAT IS ACCESSIBLE
USING THE RDMA STag, THE ALLOCATED PORTION TO
INCLUDE AN OS KERNEL AND ONE OR MORE DEVICE
DRIVERS
1008
```

```
RECEIVE THE RDMA STag FROM THE REMOTE CLIENT AND
FORWARD THE RDMA STag TO THE NVMe CONTROLLER TO
ENABLE THE REMOTE CLIENT TO ACCESS THE STORAGE
DEVICE AND LOAD THE OS KERNEL AND THE ONE OR MORE
DEVICE DRIVERS TO REMOTELY BOOT THE REMOTE CLIENT
1010
```

*FIG. 10*

Storage Medium 1100

*Computer Executable Instructions for 1000*

FIG. 11

NW I/O Device 1200

Processing Component 1240

Apparatus 900

Storage Medium 1100

Other Network I/O Device Components 1250

Communications Interface 1260

FIG. 12

180
TECHNIQUES TO INITIALIZE FROM A REMOTELY ACCESSIBLE STORAGE DEVICE

TECHNICAL FIELD

Examples described herein are generally related to initializing a device (e.g., "booting") from a remotely located storage device.

BACKGROUND

An ability to initialize or boot a computing device from a network may be used in some deployments of computing resources. In some examples, booting from a network may allow client devices to be deployed and operated without a hard disk or solid state drive. Lack of a hard disk or hard drive may allow for reduced costs, simpler maintenance management and greater consolidation of storage resources. Also, it may be easier to securely lock down a networked client or host device with no attached storage device.

According to some examples, client or host devices may boot remotely by loading their operating system (OS) image via connection to a storage server over a network. Remote booting over the network may allow for a flexible deployment. Flexibility may be due in part to the storage server centrally controlling the OS and its configuration that may be loaded at a given remotely booted client device.

BRIEF DESCRIPTION OF THE DRAWINGS

FIG. 6 illustrates an example of a first logic flow.
FIG. 10 illustrates an example of a second logic flow.
FIG. 11 illustrates an example of a second storage medium.
FIG. 12 illustrates an example of a second network input/output device.

DETAILED DESCRIPTION

Figure 1:
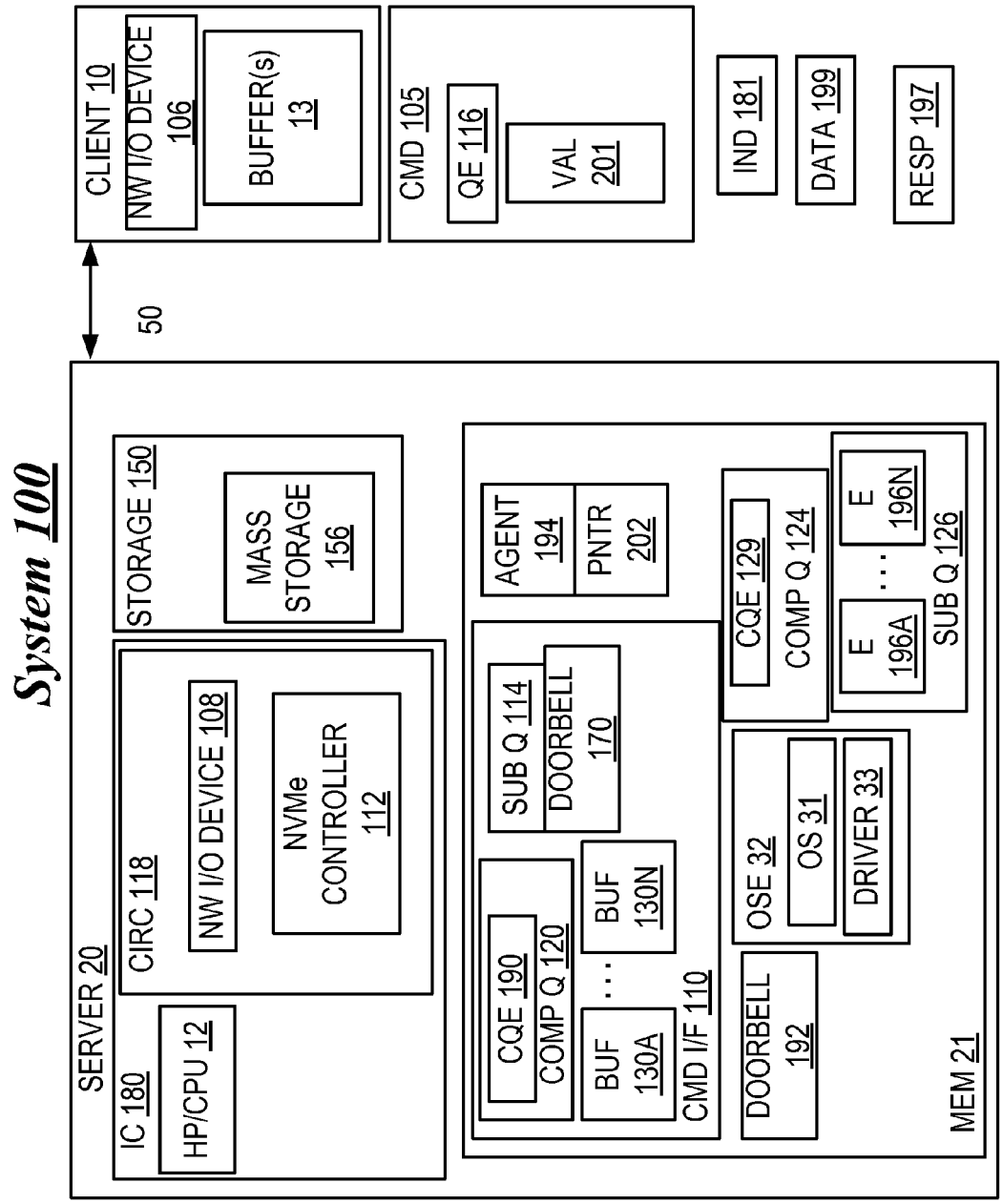
FIG. 1 illustrates a first example system.

As contemplated in the present disclosure, remote booting may allow for a flexible deployment as the OS at a given client device may be controlled by the storage server via which given client device may be remotely booted. Recently, storage servers have begun including both network (NW) input/output (I/O) devices and storage controllers having enhanced capabilities that try to minimize operating system and host processor involvement. For example, hardware elements such as command submission and command completion queues may be utilized by a storage server's NW I/O device and storage controllers to enable a client or host device to remotely access storage via a process known as remote direct memory access (RDMA).

Storage controllers maintained at these remotely accessible storage servers are also being designed to operate in compliance with relatively new interconnect communication protocols that may work well with RDMA. Further, these storage controllers may control access to hard disk drives (HDDs) or solid state drives (SSDs). The SSDs may include, but are not limited to, various types of non-volatile memory such as 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM). In some examples, access to HDDs or SSDs may include use of interconnect communication protocols described in industry standards or specifications (including progenies or variants) such as the Peripheral Component Interconnect (PCI) Express Base Specification, revision 3.0, published in November 2010 ("PCI Express" or "PCIe") and/or use of types of controller interfaces for PCIe based SSDs such as the Non-Volatile Memory Express (NVMe) Specification, revision 1.1, published in October 2012.

Storage controllers that operate in compliance with the NVMe Specification ("NVMe controllers") may be capable of minimizing operating system and host processor involvement when allowing a remote client or host device to access storage devices such as SSDs. These types of remotely accessible, NVMe controlled storage devices, when coupled with a high-speed network connection (e.g., 10 gigabits per second (Gbps) or higher), may allow for a relatively rapid boot time as compared to traditional types of locally attached rotating storage media. However, storage devices such as SSDs configured to operate with NVMe controllers are often expensive and a strong incentive exists to consolidate client use and optimize hardware provisioning of these types of storage devices. It is with respect to these and other challenges that the examples described herein are needed.

In some examples, techniques to initialize or boot a client or host device from a remotely accessible storage device may be implemented. For these examples, circuitry for a NW I/O device coupled to a host device may be capable of executing various modules to facilitate remote booting of the host device. The various modules may include a parameter module to receive one or more parameters to enable the NW I/O device to connect to a remote server (e.g., a storage server) via a network communication link. The various modules may also include a connect module to connect to the remote server using the one or more parameters and a path module to establish a control path to an NVMe controller maintained at the remote server using an RDMA protocol.

According to some examples, the various modules for execution by the circuitry for the NW I/O device may also include a receive module to receive an RDMA service tag (STag) from the NVMe controller that represents an allocated portion of a storage device controlled by the NVMe controller that is accessible using the RDMA STag. In some examples, the allocated portion may store an operating system (OS) kernel and one or more device drivers. The various modules may also include a store module to store the RDMA STag in a non-volatile memory at the NW I/O device that is accessible to a system basic input/output system (BIOS) to enable the system BIOS to use the RDMA STag to access the storage device and load the OS kernel and the one or more device drivers to remotely boot the host device.

FIG. 1 illustrates a first example system. As shown in FIG. 1 the first example system includes a system 100 having a client 10 that is communicatively coupled, via network 50, to server 20. According to some examples, the terms "host computer," "host device," "host," "client device," "client," "network node," and "node" may be used interchangeably, and may mean, for example, without limitation, one or more end stations, mobile internet devices, smart phones, media devices, input/output (I/O) devices, tablet computers, appliances, intermediate stations, network interfaces, clients, and/or portions thereof. Also, in some examples, the terms "server," "storage server" or "remote server" may be used interchangeably, and may mean, for example, without limitation, a server remotely accessible (e.g., via a network connection) to a host computer," "host device," "host," "client device," "client," "network node," and "node". Although client 10, server 20, and network 50 will be referred to in the singular, it should be understood that each such respective component may comprise a plurality of such respective components without departing from these examples.

According to some examples, a "network" may be or comprise any mechanism, instrumentality, modality, and/or portion thereof that permits, facilitates, and/or allows two or more entities to be communicatively coupled together. Also in some examples, a first entity may be "communicatively coupled" to a second entity if the first entity is capable of transmitting to and/or receiving from the second entity one or more commands and/or data. Also, data and information may be used interchangeably, and may be or comprise one or more commands (for example one or more program instructions), and/or one or more such commands may be or comprise data and/or information. Also for these examples, an "instruction" may include data and/or one or more commands.

Client 10 may include remote direct memory access (RDMA)-enabled network interface controller (RNIC) herein referred to as network (NW) I/O device 106 and/or one or more (and in the example shown in FIG. 1, a plurality of) buffers 13.

As shown in FIG. 1, server 20 may include one or more integrated circuit (IC) chips 180, memory 21, and/or storage 150. One or more chips 180 may have circuitry 118 that may include a NW I/O device 108, a manageability module 109 or an NVMe controller 112. Although not shown in FIG. 1, in some examples NW I/O device 108 and/or NVMe controller 112 may be separately attachable devices that couple to server 20 and include circuitry as described further below.

Also as shown in FIG. 1, the one or more chips 180 that may be incorporated within one or more multi-core host processors (HP) and/or central processing units (CPU) 12. Although not shown in the Figures, server 20 also may comprise one or more chipsets or devices to include, but not limited to memory or input/output controller circuitry). NW I/O device 108, NVMe controller 112, and/or HP/CPU 12 may be capable of communicating with each other. Additionally, NW I/O device 108, NVMe controller 112, manageability module 109 and/or HP/CPU 12 may be capable of accessing and/or communicating with one or more other components of server 20 (such as memory 21 and/or storage 150), via one or more such chipsets. In some examples, client 10 and/or NW I/O device 106 may be remote (e.g., geographically remote) from server 20 and/or NW I/O device 108. In other examples, client 10 and/or NW I/O device 106 may be somewhat proximately located with server 20 and/or NW I/O device 108, both located within a server rack or even on a same chip in a micro server configuration.

According to some examples, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also, in some examples, a processor, HP, CPU, processor core (PC), core, and controller each may comprise respective circuitry capable of performing one or more arithmetic and/or logical operations, and/or of executing one or more instructions. An integrated circuit chip may include one or more microelectronic devices, substrates, and/or dies. Although not shown in the FIG. 1, server 20 may have a graphical user interface system that may include, e.g., a respective keyboard, pointing device, and display system that may permit a human user to input commands to, and monitor the operation of, server 20 and/or system 100. Also, memory may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

In some examples, storage 150 may include mass storage 156. For these examples, storage 150 may include one or more devices into, and/or from which, data may be stored and/or retrieved, respectively. Also, for these examples, mass storage may include storage capable of non-volatile storage of data. For example, mass storage 156 may include, without limitation, one or more non-volatile electro-mechanical, magnetic, optical, and/or semiconductor storage devices. These devices may include hard disk drives (HDDs) or solid state drives (SSDs). The SSDs may have non-volatile types of memory such as 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

According to some examples, manageability module 109, NVMe controller 112, storage 150 or mass storage 156 may be capable of operating in compliance with the PCIe Specification and/or the NVMe Specification.

One or more machine-readable program instructions may be stored in memory 21. In operation of server 20, these machine-readable instructions may be accessed and executed by one or more host processors 12, NW I/O device 108, and/or NVMe controller 112. When executed by one or more HP 12, these one or more machine-readable instructions may result in one or more operating system environments (OSE) 32 being executed by one or more HP 12, and becoming resident in memory 21. Also when these machine-readable instructions are executed by NW I/O device 108 and/or NVMe controller 112, these one or more instructions may result in one or more command interfaces 110 of NVMe controller 112, one or more doorbells 192, one or more pointers 202, one or more agents 194, one or more completion queues 124, and/or one or more submission queues 126 being established and/or executed by NW I/O device 108 and/or NVMe controller 112, and/or becoming resident in memory 21.

According to some examples, one or more OSE 32 may include one or more operating systems (OS) 31 and/or one or more NW I/O device and/or NVMe controller drivers 33. These one or more drivers 33 may be mutually distinct from one or more OS 31. Alternatively or additionally, without departing from these examples, one or more respective portions of one or more OS 32 and/or drivers 33 may not be mutually distinct from each other and/or may be included in each other. Likewise, without departing from these examples, circuitry 118, NW I/O device 108, manageability module 109 and/or NVMe controller 112 may be distinct from, or alternatively, may be included in the one or more not shown chipsets and/or HP 12. Also without departing from these examples, one or more portions of memory 21 may be included in or maintained at NW I/O device 108, manageability module 109, NVMe controller 112, circuitry 118, HP 12, and/or IC 180.

In some examples, a portion or subset of an entity may include all or less than all of the entity. Also, for these examples, a process, thread, daemon, program, driver, operating system, application, kernel, and/or virtual machine monitor each may (1) include and/or (2) result in and/or from, execution of one or more operations and/or program instructions.

According to some examples, a command interface may facilitate, permit, and/or implement, at least in part, exchange, transmission, and/or receipt of data and/or one or more commands. For these examples, a queue, buffer, and/or doorbell may be one or more locations (e.g., specified and/or indicated by one or more addresses) in memory in which data and/or one or more commands may be stored, at least temporarily. Also, a queue element may include data and/or one or more commands to be stored and/or stored in one or more queues, such as, for example, one or more descriptors and/or one or more commands. Additionally, for these examples, a pointer may indicate, address, and/or specify one or more locations and/or one or more items in memory.

In some examples, NW I/O device 106 and NW I/O device 108 may exchange data and/or commands via network 50 in accordance with one or more protocols that may comply and/or be compatible with an RDMA protocol such as internet wide area RDMA protocol (iWARP), Infiniband (IB) protocol, Ethernet protocol, transmission control protocol/internet protocol (TCP/IP) protocol and/or RDMA over converged Ethernet (RoCE) protocol. For example, the iWARP protocol may comply and/or be compatible with Recio et al., "An RDMA Protocol Specification," Internet Draft Specification, Internet Engineering Task Force (IETF), 21 Oct. 2002. Also for example, the Ethernet protocol may comply and/or be compatible with Institute of Electrical and Electronics Engineers, Inc. (IEEE) Std. 802.3-2008, Dec. 26, 2008. Additionally, for example, the TCP/IP protocol may comply and/or be compatible with the protocols described in Internet Engineering Task Force (IETF) Request For Comments (RFC) 791 and 793, published September 1981. Also, the IB protocol may comply and/or be compatible with Infiniband Architecture Specification, Vol. 2, Rel. 1.3, published November 2012. Additionally, for example, the RoCE protocol may comply and/or be compatible with Supplement to Infiniband Architecture Specification, Vol. 1, Rel. 1.2.1, Annex A16: "RDMA over Converged Ethernet (RoCE)", published April 2010. Many different, additional, and/or other protocols may be used for such data and/or command exchange without departing from these examples (e.g., earlier and/or later-developed versions of the aforesaid, related, and/or other protocols).

According to some examples, circuitry 118 may permit and/or facilitate NW I/O device 106's access, via NW I/O device 108, of one or more command interfaces 110. For example, circuitry 118 may permit and/or facilitate NW I/O device 106 being able to so access one or more command interfaces 110 in a manner that is independent of OSE 32 in server 20. This accessing may include, for example, the writing of at least one queue element (e.g., one or more queue elements (QE) 116) to one or more submission queues 114 in one or more command interfaces 110. This may cause NW I/O device 108 for forward commands to NVMe controller 112 to perform one or more operations involving storage 150 and/or mass storage 156 associated with NVMe controller 112. NVMe controller 112 may perform these one or more operations in response to the one or more queue elements 116 (e.g., after and in response to the one or more queue elements 116 being written into one or more submission queues 114 and then forwarded by NW I/O device 108). These one or more operations involving storage 150 and/or mass storage 156 may comprise one or more write operations and/or one or more read operations involving storage 150 and/or mass storage 156. For these examples, client 10 thus may be able to access storage 150 and/or mass storage 156 via the one or more read operations and/or one or more write operations executed by NVMe controller 112.

By way of example, in operation of system 100, client 10 and/or NW I/O device 106 may authenticate client 10 and/or NW I/O device 106 to server 20 and/or logic and/or features at NW I/O device 108. This may result in client 10 and/or NW I/O device 106 being granted permission to access devices maintained at or controlled by elements of server 20 (e.g., via NW I/O device 108). Contemporaneously, after or prior to this, NW I/O device 108, NVMe controller 112, one or more agents 194, and/or OSE 32 may generate, establish, and/or maintain, in memory 21 one or more interfaces 110 and/or one or more indicators 181. The one or more interfaces 110 and/or indicators 181 may indicate where in memory 21 (e.g., one or more locations) one or more interfaces 110 and/or the components thereof may be located. For example, one or more indicators 181 may indicate one or more locations in memory 21 where one or more submission queues 114, one or more completion queues 120, one or more doorbells 170, and/or one or more buffers 130A ... 130N may be located. NW I/O device 108 may provide, via network 50, one or more indicators 181 to NW I/O device 106. Thereafter, NW I/O device 106 may use one or more of the one or more indicators 181 to access one or more command interfaces 110 and/or one or more components of the one or more command interfaces 110. One or more indicators 181 may be or include one or more handles (e.g., assigned to transaction contexts) for one or more regions in memory 21, such as, in this example, one or more service tags (STags) that may comply and/or may be compatible with an RDMA (e.g., iWARP, IB, RoCE) protocol. In some examples, the one or more regions in memory 21 may be included in one or more buffers maintained to facilitate remote access of storage 150 or mass storage 156 by client 10.

After receiving one or more indicators 181, client 10 and/or NW I/O device 106 may issue one or more commands 105 to server 20, via network 50 and NW I/O device 108, to NVMe controller 112 in a manner that by-passes and/or is independent of the involvement of OSE 32. The one or more commands 105 may command NVMe controller 112 to perform one or more operations involving storage 150 and/or mass storage 156.

According to some examples, one or more commands 105 may comply and/or be compatible with an RDMA (e.g., iWARP, IB, RoCE) protocol. One or more commands 105 may include and/or specify one or more queue elements 116 that may embody and/or indicate the one or more operations involving storage 150 and/or mass storage 156 that are being commanded. Although not shown in FIG. 1, one or more commands 105 may comprise, specify, and/or indicate one or more of the indictors 181 that may indicate one or more locations in one or more submission queues 114 as one or more intended destinations of one or more queue elements 116.

In some examples, one or more queue elements 116 may result in NW I/O device 108 forwarding a command to have NVMe controller 112 perform or execute one or more write operations involving storage 150 and/or mass storage 156. Therefore, one or more commands 105 also may include and/or specify that data 199 to be written, as a result of NW I/O device 108 forwarding one or more queue elements 116 to NVMe controller 112, to storage 150 and/or mass storage 156. One or more commands 105 may include, specify, and/ or indicate one or more of the indicators 181 that may indicate one or more locations of one or more buffers (e.g., buffer(s) 13) to which data 199 is to be written (at least temporarily) to a client 10.

In some examples, in response to receipt of one or more commands 105, NW I/O device 108 may directly write (e.g., in accordance with RDMA (e.g., iWARP, IB, RoCE) protocol and/or in a manner that by-passes and/or is independent of OSE 32), in the manner commanded by one or more commands 105, one or more queue elements 116 and data 199 to one or more submission queues 114 and one or more buffers 130A, respectively. Thus, in effect, by issuing one or more commands 105 to NW I/O device 108, NW I/O device 106 may write one or more queue elements 116 and data 199 to one or more submission queues 114 and one or more buffers 130A, respectively.

One or more commands 105 also may comprise and/or specify one or more values 201 and one or more of the indicators 181 that may indicate one or more locations of one or more doorbells 170 to which one or more values 201 may be written. In response to these one or more values 201 and these one or more of the indicators 181 in one or more commands 105, NW I/O device 108 may directly write (e.g., in accordance with RDMA (e.g., iWARP, IB, RoCE) protocol and/or in a manner that by-passes and/or is independent of OSE 32), in the manner commanded by one or more commands 105, one or more values 201 in doorbell 170. The writing of one or more values 201 in doorbell 170 may ring doorbell 170. Thus, in effect, by issuing one or more commands 105 to NW I/O device 108, NW I/O device 106 may ring doorbell 170.

According to some examples, the ringing of a doorbell that is associated with an entity may comprise and/or involve the writing one or more values to one or more memory locations (e.g., associated with, comprising, and/or embodying the doorbell) that may result in and/or trigger the entity performing one or more operations and/or actions. In some examples, the doorbells 170 and/or 192 may appear to CPU 12 and/or server 20 as one or more respective memory locations (not shown) in respective memory (not shown) in NVMe controller 112 and/or NW I/O device 108, respectively.

In some examples, responsive to the ringing of doorbell 170, NVMe controller 112 may return to a fully operational state (e.g., if NVMe controller 112 had previously entered a reduced power state relative to this fully operational state), and may read one or more queue elements 116 that were written into one or more submission queues 114. NVMe controller 112 may then execute the one or more commands that are specified and/or embodied by one or more queue elements 116. This may result in NVMe controller 112 performing the one or more operations (e.g., one or more writes to storage 150 and/or mass storage 156 of data 199 stored in one or more buffers 130A) involving storage 150 and/or mass storage 156.

According to some examples, after completion of these one or more operations involving storage 150 and/or mass storage 156, NVMe controller 112 may generate and write one or more completion queue elements (CQE) 129 to one or more completion queues 124. Also after completion of these one or more operations involving storage 150 and/or mass storage 156, NVMe controller 112 or manageability module 109 may write one or more values to one or more doorbells 192 associated with NW I/O device 108. This may ring one or more doorbells 192. In response to the ringing of one or more doorbells 192, NW I/O device 108 may write (e.g., via one or more RDMA write operations) one or more completion queue elements 190 to one or more completion queues 120 and then forward the one or more completion queue elements 190 to one or more buffers 13 in client 10 (e.g., via one or more responses 197).

In some examples, after one or more (e.g., several) such write and/or read operations involving storage 150 and/or mass storage 156 have been performed, one or more agents 194 may carry out certain management functions. For example, one or more agents 194 may establish one or more submission queue entries/elements (E) 196A . . . 196N in one or more submission queues 126 associated with NW I/O device 108 and/or one or more submission queue entries/ elements QE A . . . QE N in table 250 (see FIG. 2). As is discussed more below, these elements 196A . . . 196N and/or QE A . . . QE N, when executed by NW I/O device 108, may permit and/or facilitate copying or forwarding of one or more other queue entries (e.g., one or more NVMe controller 112 completion entries 129) to client 10 and/or NW I/O device 106 and/or data read by NVMe controller 112.

According to some examples, these management functions also may include the updating (e.g., appropriately advancing) by one or more agents 194 of one or more pointers (e.g., ring pointers PNTR 202) associated with one or more queue pairs (e.g., submission/completion queue pair 114, 120 and/or submission/completion queue pair 126, 124) associated with the NW I/O controller 108 and the NVMe controller 112. This may permit new entries to the queue pairs to be stored at locations that will not result in erroneous overwriting of other entries in the queue pairs. Additionally, as part of these management functions, the one or more agents 194 may indicate one or more of the buffers 130A . . . 130N that may be available to be reused.

As another example, one or more queue elements 116 may command that NVMe controller 112 perform one or more read operations involving storage 150 and/or mass storage 156. Therefore, one or more commands 105 also may include and/or specify one or more locations (e.g., Namespaces) in storage 150 and/or mass storage 156 from which NVMe controller 112 is to read data 199, as a result of executing one or more queue elements 116.

According to some examples, in response to receipt of one or more commands 105, NW I/O device 108 may directly write (e.g., in accordance with an RDMA (e.g., iWARP, IB, RoCE) protocol and/or in a manner that by-passes and/or is independent of OSE 32), in the manner commanded by one or more commands 105, one or more queue elements 116 to one or more submission queues 114. Thus, in effect, by issuing one or more commands 105 to NW I/O device 108, NW I/O device 106 may write one or more queue elements 116 to one or more submission queues 114 and one or more buffers 130A, respectively.

In this example, one or more commands 105 also may comprise and/or specify one or more values 201 and one or more of the indicators 181 that may indicate one or more locations of one or more doorbells 170 to which one or more values 201 are to be written. In response to these one or more values 201 and these one or more of the indicators 181 in one or more commands 105, NW I/O device 108 may directly write (e.g., in accordance with an RDMA (e.g., iWARP, IB, RoCE) protocol and/or in a manner that by-passes and/or is independent of OSE 32), in the manner commanded by one or more commands 105, one or more values 201 in doorbell 170. The writing of one or more values 201 in doorbell 170 may ring doorbell 170. Thus, in effect, by issuing one or more commands 105 to NW I/O device 108, NW I/O device 106 may ring doorbell 170.

According to some examples, responsive to the ringing of doorbell 170, NVMe controller 112 may return to a fully operational state (e.g., if NVMe controller 112 had previously entered a reduced power state relative to this fully operational state), and may read one or more queue elements 116 that were written into one or more submission queues 114. NVMe controller 112 then may execute the one or more commands that are specified and/or embodied by one or more queue elements 116. This may result in NVMe controller 112 performing the one or more operations (e.g., one or more reads of storage 150 and/or mass storage 156 to obtain data 199) involving storage 150 and/or mass storage 156 and storing data 199 in one or more buffers (e.g., one or more buffers 130A).

In some examples, after completion of these one or more operations involving storage 150 and/or mass storage 156, NVMe controller 112 may generate and write one or more completion queue elements 129 to one or more completion queues 124. Also after completion of these one or more operations involving storage 150 and/or mass storage 156, NVMe controller 112 also may write one or more values to one or more doorbells 192 associated with NW I/O device 108. This may ring one or more doorbells 192. Responsive to the ringing of one or more doorbells 192, NW I/O device 108 may obtain queue elements 129 from the one or more completion queues 124 and forward or write one or more completion queue elements 190 to one or more completion queues 120 to facilitate the transfer of data 199 (e.g., via on or more RDMA write operations with NW I/O device 106) to one or more buffers 13 in client 10 (e.g., via one or more responses 197). Alternatively, manageability module 109 may obtain queue elements 129 from completion queues 124 and forward or write completion queue elements 190 to completion queues 120 to facilitate the transfer of data 199 to buffers 13.

According to some examples, command interface 110 may be asynchronous in that, for example, completion queue elements may not be stored in an order in one or more completion queues 120 that corresponds to (1) the order in which command queue elements are stored in the one or more submission queues 114, (2) the order in which such command queue elements are forwarded for execution and/or completion by the NVMe controller 112, and/or (3) the order in which completion queue elements 190 are stored in one or more completion queues 120 and/or provided to NW I/O device 106 and/or client 10. In operation, NW I/O device 106 and/or client 10 may appropriately reorder, in the case of write commands issued from the client 10 and/or NW I/O device 106, corresponding completion queue elements 190 received from NW I/O device 108. However, in the case of read commands, in this embodiment, in order to permit respective data read from storage 150 and/or mass storage 156 to be appropriately associated with corresponding completion queue elements 190 for transmission to client 10 and/or NW I/O device 106, each completion queue element (e.g., completion queue element 190) resulting from completion indications placed in completion queues 120 by NW I/O device 108 may include the elements illustrated in FIG. 2.

Figure 2:
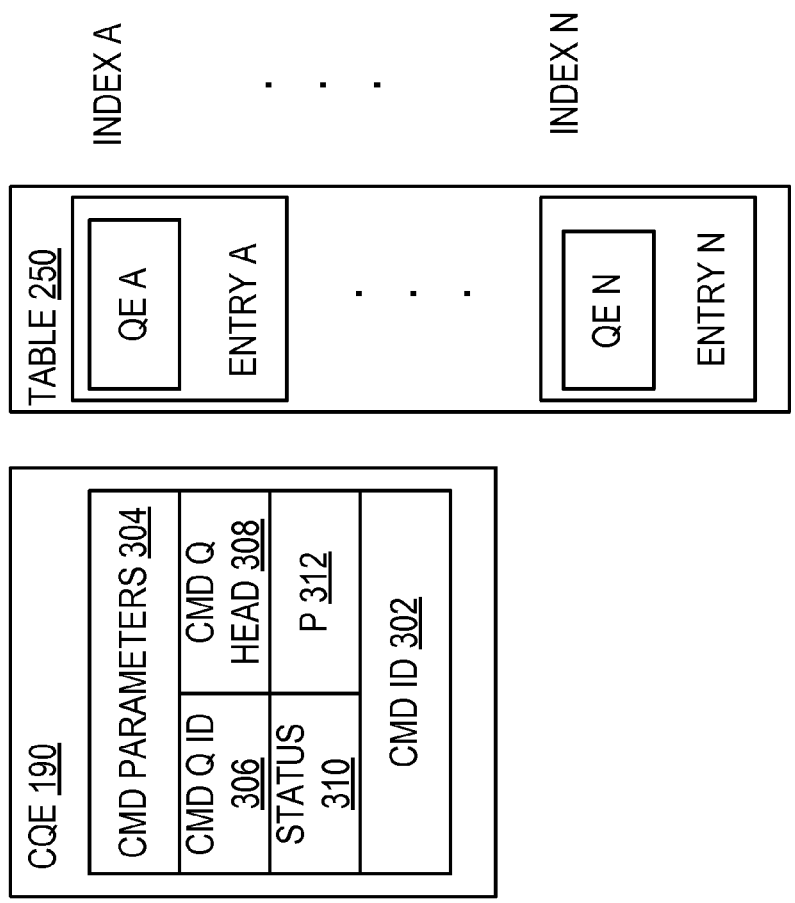
FIG. 2 illustrates an example completion queue element.

As shown in FIG. 2, completion queue element 200 (e.g., completion queue element 190) may include one or more command parameters 304, one or more command queue identifiers 306, one or more command queue head position indicators 308, status information 310, one or more queue phase bit (P) 312, and/or one or more command identifiers 302. One or more command parameters 304 may be and/or indicate one or more command specific parameters of the one or more queue elements 116 and/or commands 105 that may correspond to and/or be associated with the one or more completion queue elements 190. One or more command queue identifiers 306 may indicate and/or specify the one or more submission queues 114 to which the one or more queue elements 116 were written. One or more command queue head position indicators 308 may indicate the current position (e.g., in the one or more submission queues 114 identified by one or more command queue identifiers 306) at which the one or more queue elements 116 may be located. Status information 310 may indicate whether the one or more commands 105 and/or one or more queue elements 116 were successfully performed by the NVMe controller 112. One or more phase bits 312 may indicate whether the one or more completion queue elements 190 constitute the most recently added valid entry (e.g., to service) in one or more completion queues 120. One or more command identifiers 302 may indicate and/or be identical to one or more corresponding command identifiers in the corresponding one or more queue elements 116. Command identifiers 302 may permit one or more completion queue elements 190 to be correctly associated with one or more corresponding queue elements 116 and/or with the respective data 199 read from the storage 150 and/or mass storage 156 as a result of the execution of these one or more corresponding queue elements 116.

In some examples, one or more command identifiers 302 may be selected so as not to collide with and/or be identical to any other command identifiers that may be currently used by any completion queue elements that have not yet been provided to client 10 and/or NW I/O device 106 by NW I/O device 108. The command identifiers that may be used in system 100 may be pre-calculated and/or pre-generated, and may be used as respective indices INDEX A . . . INDEX N for respective entries ENTRY A . . . ENTRY N in a table 250 that may be stored in memory 21. Each of the entries ENTRY A . . . ENTRY N in the table 250 may store one or more respective pre-calculated and/or pre-generated command queue elements QE A . . . QE N that may be associated with NW I/O device 108. Each respective element QE A . . . QE N may be associated with one or more respective buffers in one or more buffers 130A . . . 130N. Each of the buffers in one or more buffers 130A . . . 130N into which NVMe controller 112 may store data read from storage 150 and/or mass storage 156 also may be associated with one or more respective submission identifiers used in system 100 and/or respective entries ENTRY A . . . ENTRY N.

The command queue elements QE A . . . QE N may be stored and/or maintained in table 250 by client 10 and/or one or more agents 194. If one or more buffers 130A . . . 130N are statically allocated, table 250 may be static, and may correspond in terms of, for example, allocation characteristics to one or more buffers 13 that may be allocated in the client 10.

By way of example, after NVMe controller 112 reads data 199 from storage 150 and/or mass storage 156, NVMe controller 112 may store the data 199 in one or more buffers (e.g., one or more buffers 130A) that may be associated with one or more command identifiers 302, and may send an indication to NW I/O device 108 that an access command has been completed, e.g., ringing one or more doorbells 192. Responsive to NVMe controller 112 ringing one or more doorbells 192, NW I/O device 108 may determine, based upon one or more queue phase bits 312, the one or more most recently added valid completion queue in one or more completion queues 120. NW I/O device 108 may use the one or more command identifiers 302 in one or more completion queue elements 190 to index into table 250 to locate the one or more entries (e.g., one or more entries ENTRY A) and one or more command queue elements (e.g., one or more queue elements QE A) in table 250 that may be associated with and/or identified by one or more command identifiers 302. NW I/O device 108 may execute one or more commands that may be associated with and/or embodied by these one or more command queue elements QE A. For these examples, this may result in NW I/O 108 reading one or more buffers 130A to obtain data 199, and transmitting data 199 and one or more completion queue elements 190 to NW I/O device 106 and/or client 10 (e.g., via one or more responses 197). As a result, data 199 and/or one or more completion queue elements 190 may be copied into one or more client buffers 13.

Alternatively, in some examples, NW I/O device 108 may include a state machine (not shown). This state machine may be independent and/or separate from one or more submission queues 114 that may be associated with and/or utilized by NW I/O device 108. This state machine may locate one or more command queue elements QE A in table 250 based upon one or more command identifiers 302, and may copy the one or more queue elements QE A into one or more corresponding submission queue elements 196A in one or more submission queues 126. The state machine then may signal NW I/O device 108 to access and execute one or more submission queue elements 196A in one or more submission queues 126.

Further alternatively, without departing from these examples, prior to completing one or more read operations involving storage 150 and/or mass storage 156, NVMe controller 112 may locate and/or select one or more queue elements QE A in and/or from table 250, based upon one or more command identifiers 302. NVMe controller 112 then may write into one or more completion queue elements 190 into one or more completion queues 120, and may write one or more queue elements QE A into one or more corresponding submission queue elements 196A in one or more submission queues 126. NVMe controller 112 then may ring one or more doorbells 192. This may result in NW I/O device 108 accessing and executing one or more submission queue elements 196A in one or more submission queues 126. For these examples, this may result in NW I/O device 108 reading one or more buffers 130A to obtain data 199, and transmitting data 199 and one or more completion queue elements 190 to NW I/O device 106 and/or client 10 (e.g., via one or more responses 197). As a result, data 199 and/or one or more completion queue elements 190 may be copied into one or more client buffers 13.

In this alternative example, firmware and/or one or more agents 194 executed by NW I/O device 108, NVMe controller 112 or manageability module 109 may maintain per-queue-pair context information to indicate one or more queue pairs used for RDMA transactions. This context information also may include various pointers (e.g., to one or more arrays of submission queue elements 196A ... 196N to move data from one or more buffers 130A ... 130N to one or more buffers 13, and/or the head of one or more submission queues 126), one or more locations of one or more doorbells 192 and one or more values to ring the one or more doorbells 192, and/or local copies of head and/or pointers to the one or more submission queues 126. Various of these pointers (e.g., the head and tail pointers) may be dynamically updated by firmware executed by NVMe controller 112.

Additionally or alternatively, without departing from these examples, NW I/O device 108, manageability module 109 and/or NVMe controller 112 may be comprised in the not shown chipset, or in a not shown circuit board or device. Also additionally or alternatively, without departing from this embodiment, storage 150 and/or mass storage 156 may be internal to server 20 or may be external to server 20.

Further although the foregoing description has been made with reference to NW I/O device 108 being an RNIC, and NVMe controller 112 being an NVMe compliant host controller interface, the principles of this embodiment may be applied to circumstances in which protocols other than and/or in addition to RDMA or NVMe may be employed, and/or in which NVMe controller 112 may be involved in executing and/or facilitating operations that do not involve storage 150 (e.g., other and/or additional input/output and/or communication-related operations). Accordingly, without departing from the above mentioned examples, NW I/O device 108 may utilize, and/or communications between client 10 and server 20 may employ, protocols other than and/or in addition to RDMA. Also, without departing from this embodiment, NW I/O device 108, manageability module 109 or NVMe controller 112 may be involved in executing and/or may facilitate execution of such other and/or additional operations that may operate in accordance with PCIe protocols or the NVMe interface. In these additional and/or alternative arrangements, hardware and/or firmware circuitry (not shown) may be included in circuitry 118 that may permit writing to doorbells 170 and/or 192 via, e.g., one or more interrupt mechanisms (e.g., one or more message signaled interrupts (MSI/MSI-X) and/or other mechanisms). This embodiment should be viewed broadly as covering all such modifications, variations, and alternatives.

Thus, in some examples, circuitry may be arranged to enable a first NW I/O device in a client to access, via a second NW I/O device in a server that is remote from the client and in a manner that is independent of an operating system environment in the server, command interface of another (e.g., storage, and/or another/additional type of) controller of the server. The NW I/O device in the client and the NW I/O device in the server may be or comprise respective remote direct memory access-enabled network interface controllers (e.g., controllers capable of utilizing and/or communicating via RDMA). The command interface may include at least one (e.g., storage, and/or other/additional type of) controller command queue. Such accessing may include writing at least one queue element to the at least one submission queue to command the another controller to perform at least one operation (e.g., involving storage, and/or involving one or more other and/or additional types of operations, such as, other and/or additional input/output operations) associated with the another controller (e.g., an NVMe controller). The other controller may perform the at least one operation in response to the at least one queue element. Many alternatives, variations, and modifications are possible. Some of these alternatives may include the use of a manageability module (e.g., manageability module 109) coupled between the NW I/O device and the NVMe controller at the server to facilitate the remote NW I/O device's access to the at least one command interface.

Thus, in some examples, the one or more command interfaces 110 of NVMe controller 112 in server 20 may be directly accessed by the client's NW I/O device 106 via one or more RDMA transactions, in a manner that by-passes, is independent of, and/or does not involve the server's OSE 32 and/or CPU 12. Advantageously, this may permit storage commands, data, and completion messages to be communicated between the client and server much more quickly and efficiently, and with reduced latency. Furthermore, in this embodiment, interactions between NW I/O device 108 and NVMe controller 112 may be carried out entirely or almost entirely by hardware (e.g., utilizing peer-to-peer memory and doorbell writes), and also in a manner that by-passes, is independent of, and/or does not involve the server's OSE 32 and/or CPU 12. Advantageously, this may permit such interactions to be carried out much more quickly and efficiently, and with reduce latency. Additionally, the above features of this embodiment may reduce the server's power consumption, heat dissipation, and the amount of bandwidth consumed by the OSE 32 and CPU 12.

Many other modifications are possible. For example, as stated previously, in this embodiment, client 10 may comprise a plurality of clients. If RDMA is employed for communications between server 20 and the clients 10, in this embodiment, advantageously, the clients 10 may dynamically share buffers 130A ... 130N, as a common pool of buffers, between or among the client 10 in carrying out their communications with server 20, NW I/O device 108, and/or NVMe controller 112. In order to permit such buffer sharing, NW I/O device 108 may be capable of manipulating, adjusting, and/or modifying buffer-specifying information that may be indicated in commands 105 provided to the server 20 by the clients 10 in order to allow the buffers 130A ... 130N and/or other server resources to be shared among the clients 10 without resulting in, for example, contention-related issues.

For example, the one or more indicators 181 and/or STags indicated by the one or more indicators 181 may include respective information that NW I/O device 108 may associate with one or more buffers and/or buffer pools in the buffers 130A ... 130N, instead of and/or in addition to one or more memory region handles. In this arrangement, the clients 10 may perform RDMA read operations utilizing such indicators 181 and NW I/O device 108 may perform write operations to the one or more buffers and/or buffer pools indicated by the respective information and/or indicators 181. In carrying out its operations, NW I/O device 108 may appropriately adjust the actual commands and/or command queue elements provided to NVMe controller 112 in order to result in the correct buffers, etc. being written to by NVMe controller 112 when NVMe controller 112 carries out such commands and/or command queue elements.

Alternatively or additionally, without departing from the above examples, NW I/O device 108 may include and/or be associated with a shared receive queue (not shown) to receive, for example, commands 105 from multiple clients 10. NW I/O device 108 may be capable of substituting one or more appropriate server buffer addresses, values, and/or other information into one or more portions (e.g., queue elements 116, values 201, indicators 181, and/or other information) of the received commands 105 to permit sharing of the structures in the one or more command interfaces 110 between or among multiple clients 10, without resulting in contention or other degradation in performance. In this arrangement, the clients may not be provided and/or utilize one or more STags to the storage controller's command queue and/or doorbell, and writing to these structures may be performed by the server's NW I/O device 108. Advantageously, this may permit multiple clients 10 that may be associated with and/or utilize the shared receive queue to utilize and/or share the same storage controller command queue, doorbell, and/or other structures.

For example, in the case of a write operation, one or more indicators 181, one or more values 201, and/or other information in one or more commands 105 may indicate one or more storage controller STags for the write operation (and related information), and/or one or more RDMA STags to one or more buffers to which one or more completion queue elements may be written. For these examples, based upon the one or more received commands 105 and/or other information stored in NW I/O device 108, NW I/O device 108 may select one or more buffers in buffers 130A ... 130N and one or more locations in the submission queue 114 to which to post the data 199 to be written and one or more corresponding command queue elements to be forwarded to submission queue 126 associated with NVMe controller 112. NW I/O device 108 may post the data 199 and the one or more corresponding command queue elements in accordance with such selections, and thereafter, may ring doorbell 170. As posted by NW I/O device 108, the one or more command queue elements may indicate the one or more storage controller STags supplied in the one or more commands 105, command identifier 302, security context information (e.g., to permit validation of the one or more storage controller STags), and/or one or more STags to the one or more buffers to which data 199 has been posted. After NVMe controller 112 has completed the requested one or more write operations and posted one or more completion queue elements (e.g., to completion queue 124), NVMe controller 112 may ring doorbell 192. Based upon information in table 250, NW I/O device 108 may generate and forward to the one or more clients that provided the received command 105 one or more appropriate responses 197 via forwarding the completion queue elements from completion queue 124 to completion queue 120.

In the case of a read operation, generally analogous information may be provided in command 105 and generally analogous operations may be performed by NW I/O device 108 and/or NVMe controller 112. However, in the case of a read operation, the data 199 read by NVMe controller 112 may be stored by NVMe controller 112 to one or more of the buffers 130A ... 130N specified by the NW I/O device 108, and may be read by the NW I/O device 108, instead of vice versa (e.g., as may be the case in a write operation). NW I/O device 108 may transmit the read data 199 to the one or more clients that provided the received command 105 in one or more responses 197. In the foregoing arrangement, command 105 may be similar or identical to a command that may be utilized by a client to access storage local to the client, at least from the vantage point of one or more client-executed applications initiating such access. Advantageously, this may permit remote operations and/or RDMA transactions of the types previously described to be substantially transparent to these one or more client-executed applications.

Thus, in some examples, advantageously, it may be possible for multiple clients to share the storage controller's command queue, doorbells, and/or the server's buffers, and/or to write to these structures (via the server's NW I/O device) using an RDMA protocol, without suffering from resource contention issues (and/or other disadvantages) that might otherwise occur. The server's NW I/O device may be capable of modifying information associated with and/or comprised in the clients' commands 105 to facilitate such sharing and/or sharing of RDMA STag information between or among the clients. Advantageously, this may permit RDMA protocol to be employed for command communication and/or completion information between the server and multiple clients, with improved scalability, while reducing the memory consumption to implement such features, and without degradation in communication line rate.

Figure 3:
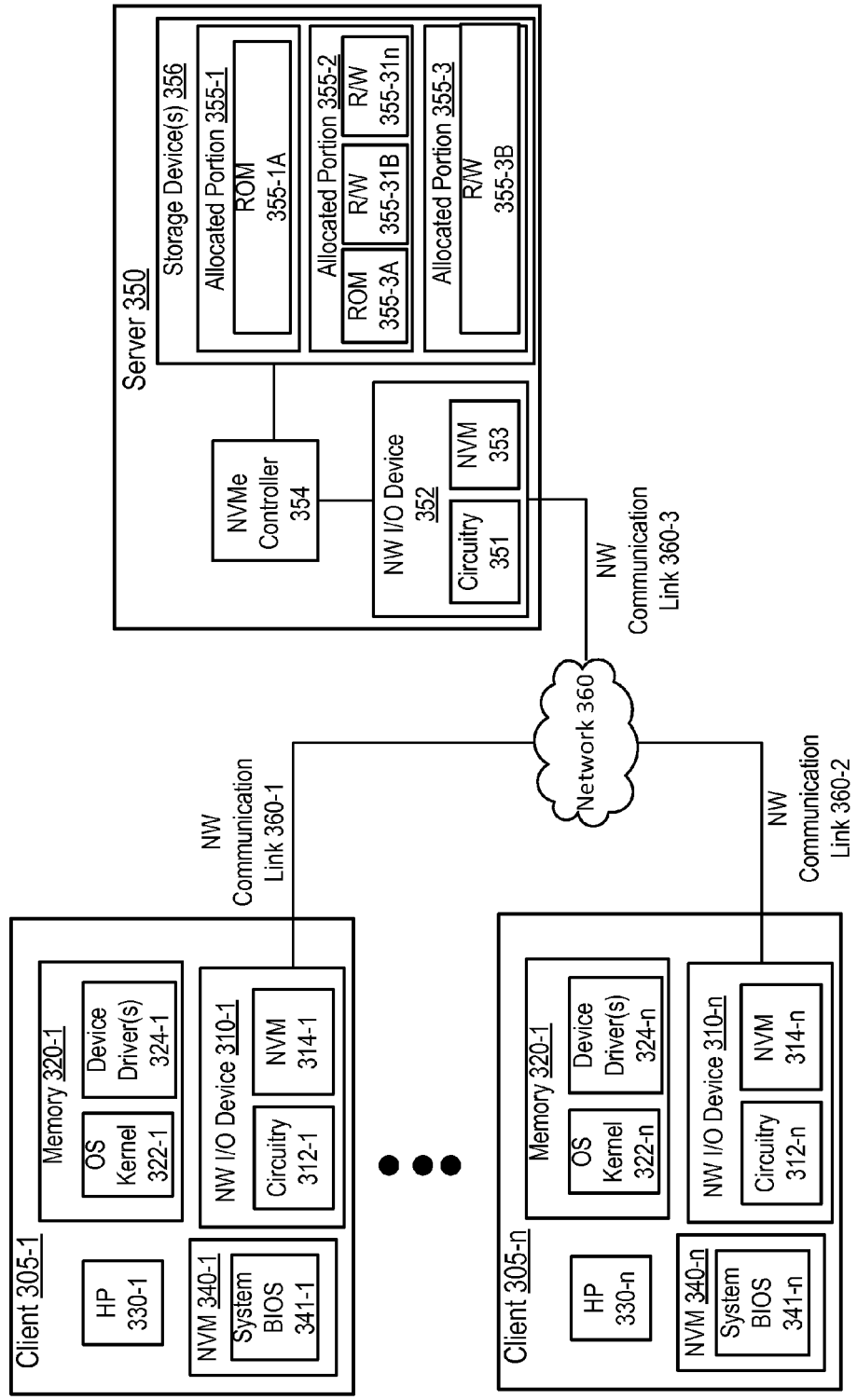
FIG. 3 illustrates a second example system.

FIG. 3 illustrates a second example system. As shown in FIG. 3, the second example includes a system 300. According to some examples, system 300 may include multiple clients 305-1 to 305-n (where "n" represents any positive integer greater than 1) and a server 350. For these examples, each client may include a NW I/O device 310, a memory 320, a host processor (HP) 330 and a non-volatile memory (NVM) 340. Also, server 350 may include a NW I/O device 352, an NVMe controller 354 and storage device(s) 356. Clients 305-1 to 305-*n* or server 350 may include additional elements or components not shown in FIG. 3. Examples are not limited in this context.

In some examples, logic and/or features at clients 305-1 to 305-*n* in cooperation with logic and/or features at server 350 may be capable of remotely booting using storage device(s) 356 controlled by an NVMe controller 354 maintained at server 350. The remote booting of any one of clients 305-1 to 305-*n* may be initiated at or near at least one of clients 305-1 to 305-*n* (e.g., toggle a power button), at or near server 350 or at centralized control point (not shown) that may manage the operations of system 300 (e.g., operator initiated). The remote booting may also be initiated due to a power cycling (intentional or unintentional) or due to a client being brought online in a given network.

According to some examples, as part of pre-boot activities, NW I/O devices 310-1 to 310-*n* and 352 may be capable of exchanging data and/or commands via respective NW communication links 360-1, 36-2 and 360-3 coupled to network 360 in accordance with one or more protocols that may comply and/or be compatible with one or more RDMA protocols such iWARP, Infiniband, Ethernet, TCP/IP or RoCE. For example, logic and/or features may be executed by circuitry 312-1 for NW I/O device 310-1 at client 305-1 to connect to a remotely located server 350 via NW communication link 360-1 coupled to network 360 using at least one of these RDMA protocols.

In some examples, the logic and/or features for execution by circuitry 312-1 may receive one or more parameters to enable NW I/O device 310-1 to connect to server 350 via NW communication link 360-1. According to some examples, the one more parameters may be received or obtained from a non-volatile memory (NVM) 314-1 maintained at NW I/O device 310-1. The one or more parameters may include information associated with establishing a network connection to server 350. For example, the one or more parameters may include, but are not limited to, an internet protocol (IP) address for server 350, authentication information to authenticate NW I/O device 310-1 and/or client 305-1 to server 350 or an identifier (e.g., node identification) for client 305-1. The one or more parameters may also include network identification information for NW communication link 360-1 to facilitate the exchange of data and/or commands over a network connection to sever 350 through network 360. The network information may include, but is not limited to, a local access network (LAN) identifier or a virtual LAN (VLAN) identifier.

According to some examples, the logic and/or features for execution by circuitry 312-1 may receive the one or more parameters from a combination of sources. For example, a first portion of the one or more parameters may be received from NVM 314-1 and a second portion may be received from server 350 (e.g., maintained/stored in NVM 353). The first portion may include, but is not limited to, an identifier for client 305-1 or authentication information to authenticate client 305-1 to server 350. The second portion may include information to be used by client 305-1 to locate and communicate with sever 350 such as an IP address for server 350 or network identification information to include, but not limited to, a LAN or VLAN identifier.

In some examples, the logic and/or features for execution by circuitry 321-1 may also establish a control path to NVMe controller 354 maintained at server 350. For these examples, an RDMA protocol such as iWARP, Infiniband, Ethernet, TCP/IP or RoCE may be used to establish the control path to NVMe controller 354 in a similar manner as described above for establishing a control path to NVMe controller 112 for FIG. 1. Once the control path is established, the logic and/or features may then be capable of discovering one or more properties for storage device(s) 356. The one or more properties may include, but are not limited to, storage device properties such as number of storage devices, type(s) of memory for each storage device, available memory capacity or access rights (e.g., read only memory (ROM) or read/write (R/W) memory), directory information or share names.

According to some examples, logic and/or features for execution by circuitry 321-1 at NW I/O device 310-1 may be capable registering the one or more discovered properties with a system BIOS 341-1. As shown in FIG. 3, for some examples, system BIOS 341-1 may be maintained in NVM 340-1 and may be executed by circuitry of client 305-1 such as HP 330-1. As described more below, the registered one or more discovered properties may be used to facilitate the remote booting of client 305-1 via remote access to storage device(s) 356.

Although not shown in FIG. 3, in some examples, rather than registering the one or more discovered properties with a system BIOS, logic and/or features for execution by circuitry 321-1 at NW I/O device 310-1 may also be capable of working in cooperation with other types of boot-related/startup firmware possibly stored in NVM 340-1. For example, the firmware may be for a unified extensible firmware interface (UEFI) or for an extensive firmware interface (EFI). This UEFI or EFI firmware may perform similar functions as described in this disclosure for BIOS 341-1.

In some examples, logic and/or features for execution by circuitry 321-1 at NW I/O device 310-1 may be capable of receiving an RDMA STag from NVMe controller 354 (e.g., via the established control path). For these examples, the RDMA STag may represent an allocated portion of storage device(s) 356 that may be accessible using the RDMA STag. For example, the received RDMA STag may represent access to one of allocated portions 355-1, 355-2 or 355-3. Also, for these examples, a given allocated portion represented by the received RDMA STag may store an OS kernel and one or more device drivers that may be used to remotely boot client 305-1.

According to some examples, logic and/or features for execution by circuitry 321-1 may store a received RDMA STag representing allocated portions in a non-volatile memory maintained at NW I/O device 310 such as NVM 314-1. For these examples, the RDMA STag may be accessible to system BIOS 341-1 to enable system BIOS 341-1 to use the RDMA STag to access storage device(s) 356 and load the OS kernel 322-1 and device driver(s) 324-1 to memory 320-1 in order to remotely boot client 305-1.

In some examples, allocated portions of storage device(s) 356 accessible using the received RDMA STag may be jointly accessible by other clients connected to server 350 via respective separate network communication links. For these examples, in an effort to consolidate storage resources, a same allocated portion of storage device(s) 356 may be shared between clients 305-1 to 305-*n*. For example, an RDMA STag representing allocated portion 355-1 may allow for read only access to allocated portion 355-1. Shared access to the same OS kernel and device drivers may allow for a uniform remote booting of clients 305-1 to 305-*n*.

In some other examples, the received RDMA STag may allow for both a shared read only access to allocated portions of storage device(s) 356 and a private read/write access to allocated portions of storage device(s) 356. For these examples, the shared allocated portions of storage device(s) 356 may be system-wide related information used to remotely boot all clients of system 300. Meanwhile the private read/write access may allow for client-specific information to be used to remotely boot a given client. For example, an RDMA STag may represent allocated portion 355-2 and logic and/or features at server 350 may be capable of determining if the RDMA STag also allows a given client to access to both shared (read only 355-3A) and private allocated portions (R/W 335-3B1 or 335-3Bn). According to some examples, if the given client is client 305-1 the logic and/or features at server 350 may determine that an RDMA STag used by client 305-1 to access allocated portion 355-2 allows for access to both read only 355-3A and R/W 355-3B1. Also, if the given client is client 305-n the logic and/or features at server 350 may determine that an RDMA STag used by client 305-n to access allocated portion 355-2 allows for access to both read only 355-3A and R/W 355-3Bn. Thus, for these examples, logic and/or features at the given client may be unaware of the first and second portions accessible via the RDMA STag. In some other examples, separate RDMA STags (one for read only 355-3A and one for R/W 355B) may be used to provide access to allocated portion 355-2. For these other examples, logic and/or features at the given client may make the determination as to which allocated portion to access to remotely boot the given client device.

According to some examples, a client such as client 305-1 may use the RDMA STag that allows for access of allocated portion 355-2 to enable system BIOS 341-1 to first load to memory 320-1 from read only 355-3A OS kernel 322-1 and device driver(s) 324-1. For these examples, OS kernel 322-1 and device driver(s) 324-1 may then use the RDMA STag to obtain from R/W 355-3B1 information specific to and/or assigned for the configuration of client 305-1. For some examples, the information specific to and/or assigned for the configuration of client 305-1 may include, but is not limited to, configuring client 305-1 to operate as a database server, a file server, a mail server, a print server, a web server, an application server, a gaming server or a virtual server hosting one or more tenants.

Figure 4:
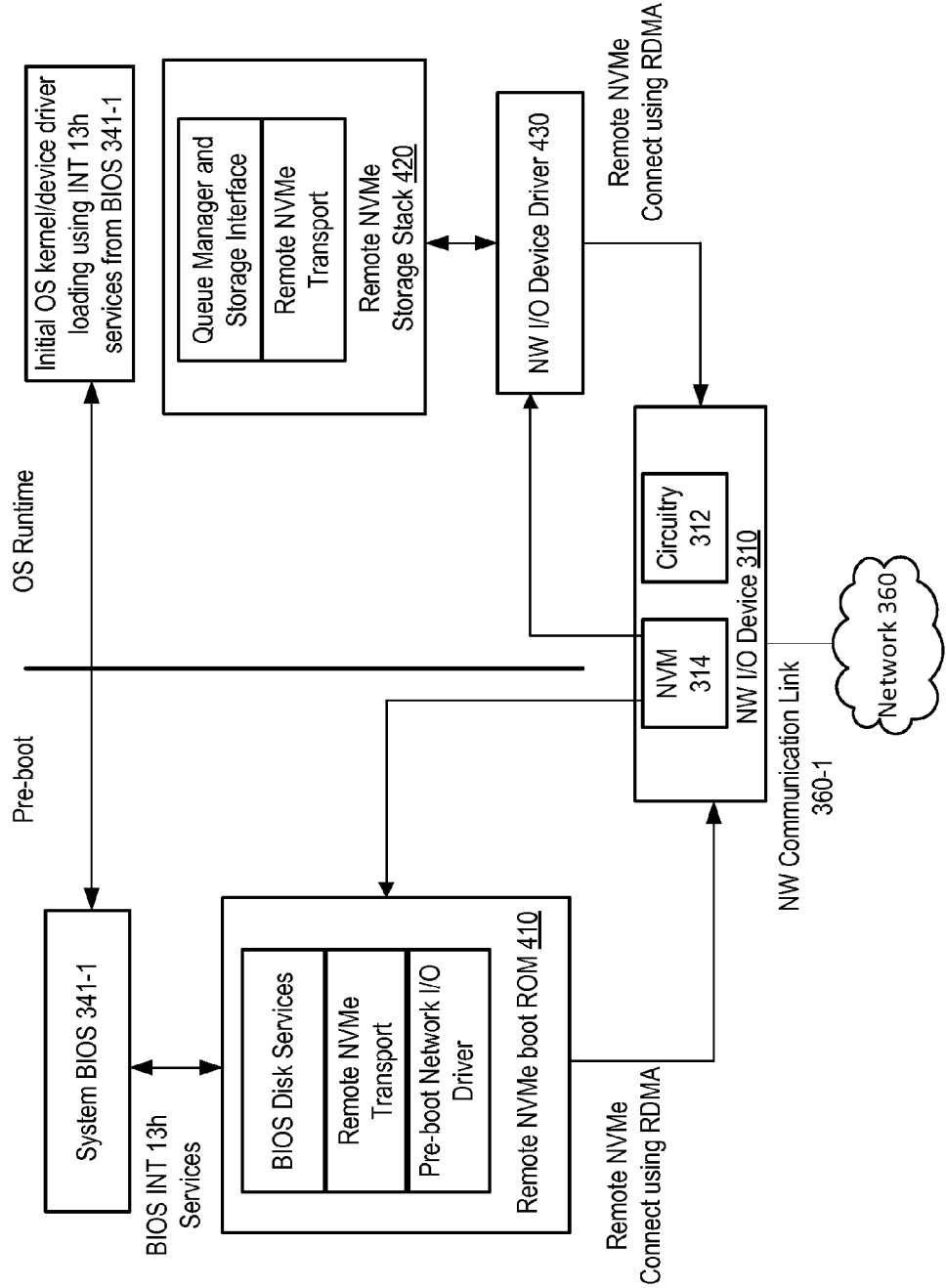
FIG. 4 illustrates a remote boot scheme.

FIG. 4 illustrates a remote boot scheme 400. As shown in FIG. 4, remote boot scheme 400 includes a pre-boot and OS runtime portion. According to some examples, remote boot scheme 400 may be implemented by elements of client 305-1. For example, as shown in FIG. 4, circuitry 312 of NW I/O device 310 may execute logic and/or features to use NW communication link 360-1 to connect to a remote server such as server 350 through network 360 as mentioned above for FIG. 3. Also, system BIOS 341-1 may be used to transition from pre-boot to OS runtime operations as described in more detail below.

According to some examples, a remote NVMe boot read only memory (ROM) 410 may be located, loaded and then executed by circuitry 312 at network I/O device 310. For these examples, remote NVMe boot ROM 410 may be initially maintained/stored in NVM 314 and once loaded may provide a pre-boot network I/O driver, remote NVMe transport and BIOS disk services as indicated in FIG. 4. For example, using the pre-boot network I/O driver and the remote NVMe transport, logic and/or features executed by circuitry 312 may connect to a remote server, establish a control path to an NVMe controller maintained at the server, and discover one or more properties of storage device(s) controlled by the NVMe controller. Also, BIOS disk services may be used by the logic and/or features to communicate or register the one or more discovered properties of the storage device(s) to system BIOS 341-1.

In some examples, BIOS disk services included as part of remote NVMe boot ROM 410 may include loading BIOS interrupt call 13hex (INT 13h) services for use by system BIOS 314-1 to facilitate initial loading of an OS kernel and device driver(s) from the storage device(s) controlled by the NVMe controller maintained at the remote server. For these examples, OS kernel 322-1 and device driver(s) 324-1 may be loaded (e.g., to memory 320-1) and OS runtime operations may begin. As part of OS runtime, a remote NVMe storage stack 420 may be implemented by OS kernel 322-1. As shown in FIG. 4, a NW I/O device driver 430 may also be setup/implemented from among device driver(s) 324-1 to maintain a remote NVMe connection using RDMA protocols to communicate with the NVMe controller at the remote server.

According to some examples, as highlighted by the arrow between NVM 314 and NW I/O device driver 430, information stored/maintained at NVM 314 may be provided to facilitate maintenance of the remote NVMe connection. For example, logic and/or features of NW I/O device 310 may be capable of supporting BIOS enhanced disk driver (EDD) services. Support for BIOS EDD may enable the logic and/or features of NW I/O device 310 to allow for a seamless transition from pre-boot to OS runtime as parameters, properties and/or RDMA STags obtained during pre-boot are exchanged/made available to OS kernel 322-1 or device driver(s) 324-1 during OS runtime.

Figure 5:
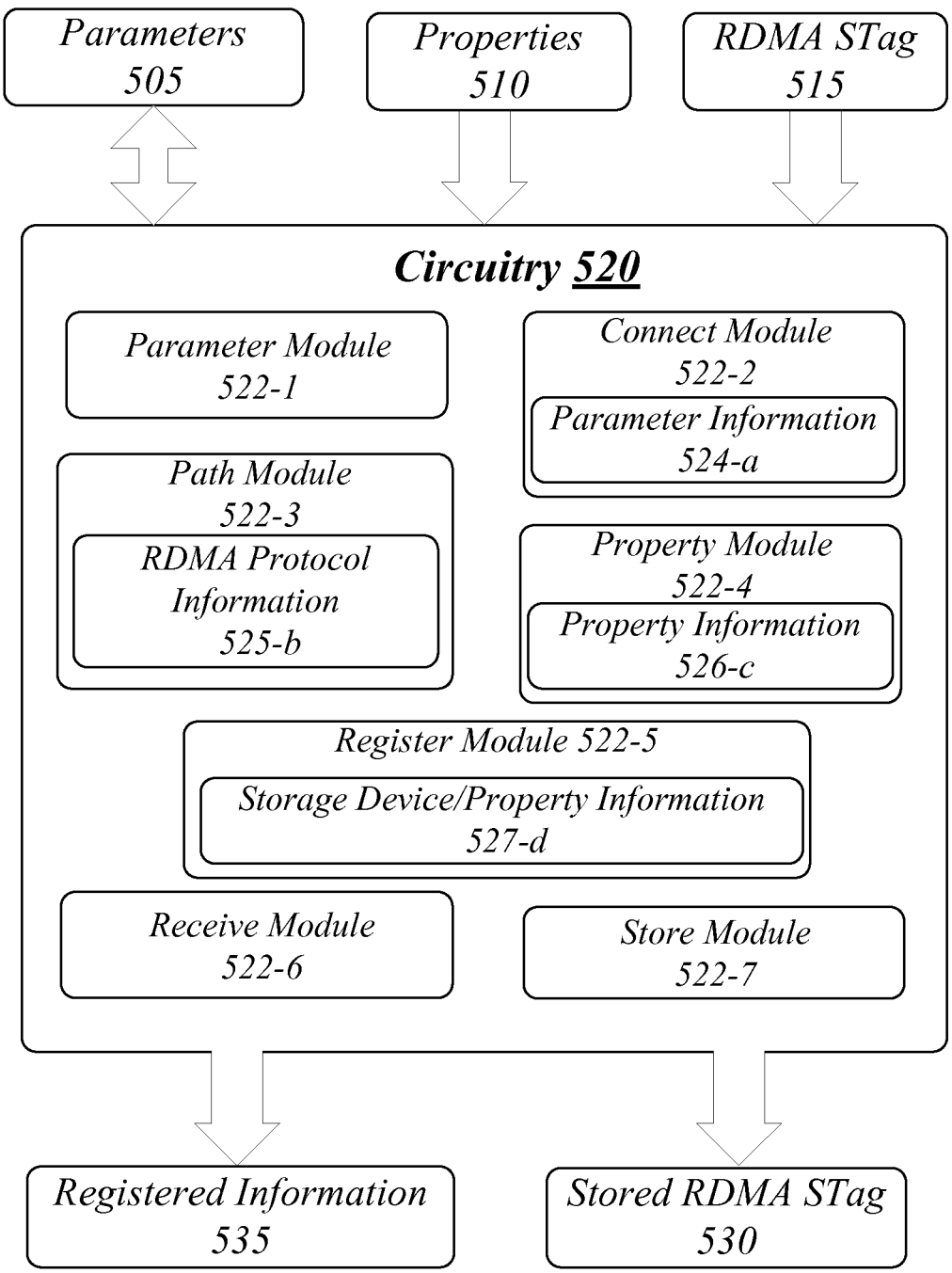
FIG. 5 illustrates an example block diagram for a first apparatus.

FIG. 5 illustrates an example block diagram of a first apparatus. As shown in FIG. 5, the first apparatus includes apparatus 500. Although apparatus 500 shown in FIG. 5 has a limited number of elements in a certain topology, it may be appreciated that the apparatus 500 may include more or less elements in alternate topologies as desired for a given implementation.

The apparatus 500 may be supported by circuitry 520 maintained at a NW I/O device coupled to a client or host device. Circuitry 520 may be arranged to execute one or more software or firmware implemented components or modules 522-a. It is worthy to note that "a" and "b" and "c" and similar designators as used herein are intended to be variables representing any positive integer. Thus, for example, if an implementation sets a value for a=7, then a complete set of software or firmware for modules 522-a may include modules 522-1, 522-2, 522-3, 522-4, 522-5, 522-6 or 522-7. The examples presented are not limited in this context and the different variables used throughout may represent the same or different integer values.

According to some examples, circuitry 520 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 520 may also be an application specific integrated circuit (ASIC) and at least some modules 522-a may be implemented as hardware elements of the ASIC.

According to some examples, apparatus 500 may include a parameter module 522-1 for execution by circuitry 520. Parameter module 522-1 may be capable of receiving parameters 505 to enable a NW I/O device having apparatus 500 to connect to a remote server via a NW communication link. In some examples, the one or more parameters may be received from a non-volatile memory maintained at the NW I/O device or at least a portion of the parameters may be received from the remote server.

In some examples, apparatus 500 may also include a connect module 522-2 for execution by circuitry 520. Connect module 522-2 may be capable of connecting to the remote server using the one or more parameters received by parameter module 522-1. Connect module 522-2 may be capable of at least temporarily storing parameter information 524-a (e.g., in a data structure such as a lookup table (LUT)) to facilitate in connecting to the remote server. Parameter information 524-a may include information used by connect module 522-2 to locate the remote server (e.g., an IP address), identify the client or host device to the remote server, authenticate the client or host device to the remote server, or network identification information such as a LAN identifier or a VLAN identifier.

In some examples, apparatus 500 may also include a path module 522-3 for execution by circuitry 520. Path module 522-3 may be capable of establishing a control path to an NVMe controller maintained at the remote server using one or more RDMA protocols. For these examples, path module 522-3 may be capable of at least temporarily storing RDMA protocol information 525-b (e.g., in an LUT) in order to establish the control path. The one or more RDMA protocols may include, but are not limited to, iWARP, Infiniband or RoCE protocols.

According to some examples, apparatus 500 may also include a property module 522-4 for execution by circuitry 520. Property module 522-4 may be capable of discovering one or more properties 510 for a storage device or storage devices controlled by the NVMe controller at the remote server. For these examples, property module 522-4 may at least temporarily store property information 526-c discovered from properties 510 in a data structures such as a LUT or in a non-volatile memory maintained at the NW I/O device that includes apparatus 500. The one or more properties discovered may include, but are not limited to, a number of storage devices controlled by the NVMe controller, properties of the storage device(s) such as type(s) of memory, available capacity or access rights, e.g., ROM or R/W memory.

In some examples, apparatus 500 may also include a register module 522-5 for execution by circuitry 520. Register module 522-5 may be capable of registering the storage device(s) and the one or more discovered properties with a system BIOS for the host or client device coupled to the NW I/O device having apparatus 500. For these examples, register module 522-5 may at least temporarily store storage device/property information 527-d in a data structure such as a non-volatile memory maintained at the NW I/O device. Also, as part of registering the storage device(s) and the one or more discovered properties, register module 522-5 may provide registered information 535 to the system BIOS. Registered information 535 may include information for the system BIOS to locate storage/device property information 527-d, e.g., a pointer to a memory address of a non-volatile memory maintained by the NW I/O device.

According to some examples, apparatus 500 may also include a receive module 522-6 for execution by circuitry 520. Receive module 522-6 may be capable of receiving RDMA STag 515 from the NVMe controller at the remote server. For these examples, RDMA STag 515 may include an RDMA STag that represent allocated portion(s) of a storage device controlled by the NVMe controller that is accessible using the RDMA STag. Also, for these examples, the allocated portion(s) may store an OS kernel and one or more device drivers to be used for the remote booting of the host or client device coupled to the NW I/O device having apparatus 500.

In some examples, apparatus 500 may also include a store module 522-7 for execution by circuitry 520. Store module 522-7 may be capable of storing the received RDMA STag included in RDMA Stag 515 in a non-volatile memory as stored RDMA STag 530 at the NW I/O device having apparatus 500. For these examples, stored RDMA STag 530 may be accessible to the system BIOS for the host or client device coupled to the NW I/O device. According to some examples, the system BIOS may use the RDMA STag included in stored RDMA STag 530 to access the storage device and load the OS kernel and the one or more device drivers to remotely boot the host or client device.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 6 illustrates an example of a first logic flow. As shown in FIG. 6, the first logic flow includes logic flow 600. Logic flow 600 may be representative of some or all of the operations executed by one or more logic, features, or devices described herein, such as apparatus 500. More particularly, logic flow 600 may be implemented by parameter module 522-1, connect module 522-2, path module 522-3, receive module 522-6 or store module 522-7.

According to some examples, logic flow 600 at block 602 may receive, at a NW I/O device coupled to a host device, one or more parameters to enable the NW I/O device to connect to a remote server via a NW communication link. For example, parameters 505 including the one or more parameters may be received by parameter module 522-1 included in an apparatus 500 for a NW I/O device coupled to the host device.

In some examples, logic flow 600 at block 604 may connect to the remote server using the one or more parameters. For example, connect module 522-2 may use the one parameters included in parameters 505 to connect to the remote server. The one or more parameters may include information to facilitate connection via the NW communication link to include an IP address for the remote server, identifier information for the host device or authentication information to authenticate the host device to the remote server.

According to some examples, logic flow 600 at block 606 may then establish a control path to an NVMe controller maintained at the remote server using an RDMA protocol. For example, path module 522-3 may use RDMA protocol information 524-b having information to establish a control path using such protocols as iWARP, Infiniband or RoCE.

In some examples, logic flow 600 at block 608 may receive an RDMA STag from the NVMe controller that represents an allocated portion of the storage device that is accessible using the RDMA STag. For these examples, the allocated portion may store an OS kernel and one or more device drivers. For example, receive module 522-6 may receive RDMA STag 515 that includes the RDMA STag representing the allocated portion of the storage device.

According to some examples, logic flow 600 at block 610 may then store the RDMA STag in a non-volatile memory at the NW I/O device that may be accessible to a system BIOS for the host device to enable the system BIOS to use the RDMA STag to access the storage device and load the OS kernel and the one or more device drivers to remotely boot the host device. For example, store module 522-7 may store the received RDMA STag in Stored RDMA STag 530 maintained at the non-volatile memory at the NW I/O devices having apparatus 500. The system BIOS may then use the RDMA STag in Stored RDMA STag 530 to load the OS kernel and the one or more device drivers in order to remotely boot the host device.

Figure 7:
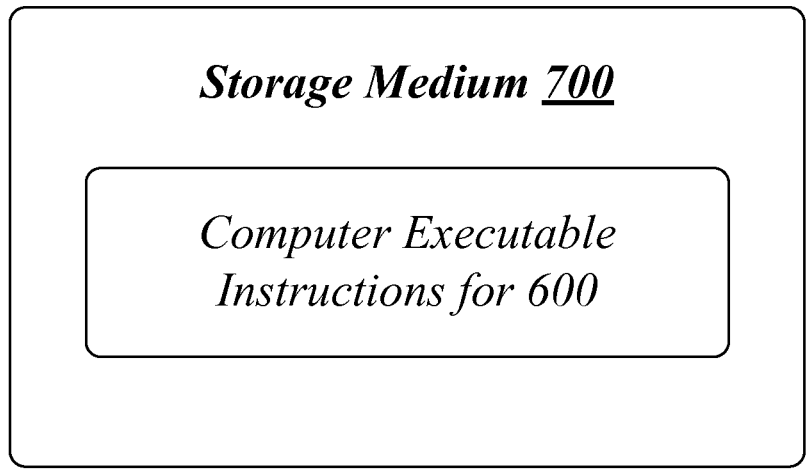
FIG. 7 illustrates an example of a first storage medium.

FIG. 7 illustrates an example of a first storage medium. As shown in FIG. 7, the first storage medium includes storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
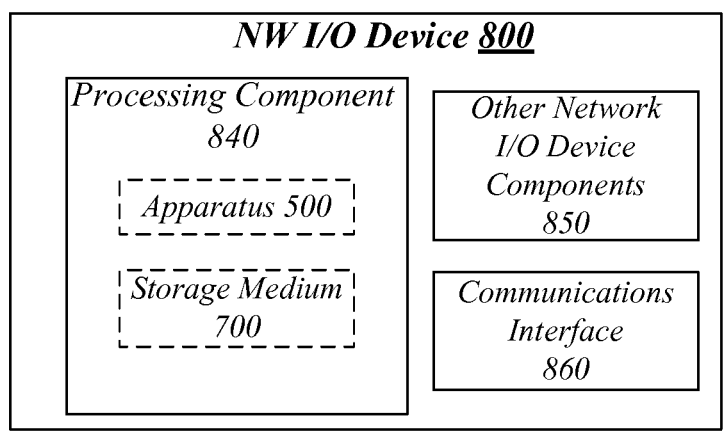
FIG. 8 illustrates an example of a first network input/output device.

FIG. 8 illustrates an example NW I/O device 800. In some examples, as shown in FIG. 8, NW I/O device 800 may include a processing component 840, other platform components or a communications interface 860. According to some examples, NW I/O device 800 may be implemented in a NW I/O device coupled to a host or client device as mentioned above.

According to some examples, processing component 840 may execute processing operations or logic for apparatus 500 and/or storage medium 700. Processing component 840 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 850 may include common computing elements, such as one or more processors, multi-core processors, co-processors, memory units, chipsets, controllers, peripherals, interfaces, oscillators, timing devices, and so forth. Examples of memory units may include without limitation various types of computer readable and machine readable storage media in the form of one or more higher speed memory units, such as ROM, RAM, DRAM, DDRAM, SDRAM, SRAM, PROM, EPROM, EEPROM, flash memory or any other type of storage media suitable for storing information.

In some examples, communications interface 860 may include logic and/or features to support a communication interface. For these examples, communications interface 860 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification, the RDMA Protocol specification, the IEEE 802-2-2008 specification, RFC 791 or RFC 793.

The components and features of NW I/O device 800 may be implemented using any combination of discrete circuitry, application specific integrated circuits (ASICs), logic gates and/or single chip architectures. Further, the features of NW I/O device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary NW I/O device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 9:
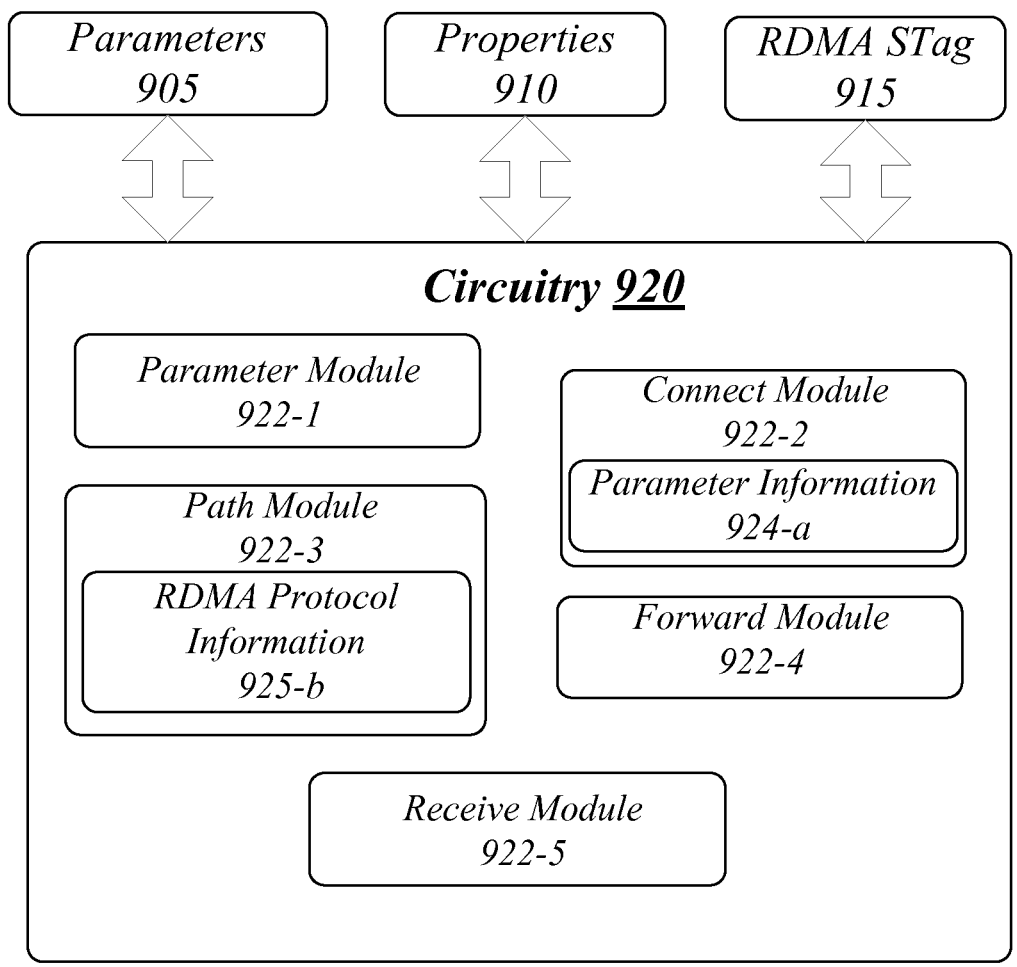
FIG. 9 illustrates an example block diagram for a second apparatus.

FIG. 9 illustrates an example block diagram of a second apparatus. As shown in FIG. 9, the second apparatus includes apparatus 900. Although apparatus 900 shown in FIG. 9 has a limited number of elements in a certain topology, it may be appreciated that the apparatus 900 may include more or less elements in alternate topologies as desired for a given implementation.

The apparatus 900 may be supported by circuitry 920 maintained at a NW I/O device located at or coupled to a server that may be remote to one or more client or host devices. Circuitry 920 may be arranged to execute one or more software or firmware implemented components or modules 922-$a$. It is worthy to note that "a" and "b" and "c" and similar designators as used herein are intended to be variables representing any positive integer. Thus, for example, if an implementation sets a value for a=5, then a complete set of software or firmware for modules 922-$a$ may include modules 922-1, 922-2, 922-3, 922-4 or 922-5. The examples presented are not limited in this context and the different variables used throughout may represent the same or different integer values.

According to some examples, circuitry 920 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 920 may also be an application specific integrated circuit (ASIC) and at least some modules 922-a may be implemented as hardware elements of the ASIC.

According to some examples, apparatus 900 may include a parameter module 922-1 for execution by circuitry 920. Parameter module 922-1 may be capable of receiving parameters 905 to enable a NW I/O device having apparatus 900 to connect to a remote client via a NW communication link. In some examples, the one or more parameters may be received from a non-volatile memory maintained at the NW I/O device or at least a portion of the parameters may be received from the remote client (e.g., authentication information).

In some examples, apparatus 900 may also include a connect module 922-2 for execution by circuitry 920. Connect module 922-2 may be capable of connecting to the remote client using the one or more parameters included in parameters 905 received by parameter module 922-1. Connect module 922-2 may be capable of at least temporarily storing information from parameters 905 in parameter information 924-a (e.g., in a data structure such LUT) to facilitate in connecting to the remote client. Parameter information 924-a may include information used by connect module 922-2 to locate the remote client (e.g., an IP address), identify the remote client, authenticate the remote client, or network identification information such as a LAN identifier or a VLAN identifier.

In some examples, apparatus 900 may also include a path module 922-3 for execution by circuitry 920. Path module 922-3 may be capable of establishing a control path between the remote client and an NVMe controller maintained at the server using one or more RDMA protocols. For these examples, path module 922-3 may be capable of at least temporarily storing RDMA protocol information 925-b (e.g., in an LUT) in order to establish the control path. The one or more RDMA protocols may include, but are not limited to, iWARP, Infiniband or RoCE protocols.

According to some examples, apparatus 900 may also include a forward module 922-4 for execution by circuitry 920. Forward module 922-4 may be capable of forwarding one or more properties 910 for a storage device or storage devices controlled by the NVMe controller at the server to the remote client. The one or more properties forwarded may include, but are not limited to, a number of storage devices controlled by the NVMe controller, properties of the storage device(s) such as type(s) of memory, available capacity or access rights, e.g., ROM or R/W memory. Forward module 922-4 may also be capable of forwarding an RDMA STag 915 generated by the NVMe controller that represents an allocated portion of a given storage device or storage devices that may be accessible using one or more RDMA STags included in RDMA STag 915. For these examples, the allocated portion may include an OS kernel and one or more device drivers.

According to some examples, apparatus 900 may also include a receive module 922-5 for execution by circuitry 920. Receive module 922-5 may be capable of receiving the one or more RDMA STags that were included in RDMA STag 915 forwarded to the remote client by forward module 922-4. For these examples, the received RDMA STag 915 may then be forwarded to the NVMe controller to enable the remote client to access the one or more storage devices controlled by the NVMe controller and load the OS kernel and the one or more device drivers to remotely boot the remote client.

FIG. 10 illustrates an example of a second logic flow. As shown in FIG. 10, the second logic flow included logic flow 1000. Logic flow 1000 may be representative of some or all of the operations executed by one or more logic, features, or devices described herein, such as apparatus 900. More particularly, logic flow 1000 may be implemented by parameter module 922-1, connect module 922-2, path module 922-3, forward module 922-4 or receive module 922-5.

According to some examples, logic flow 1000 at block 1002 may receive one or more parameters associated with connecting to a remote client via a NW communication link. For example, parameters 905 may be received by parameter module 922-1 included in an apparatus 900 for a NW I/O device coupled to a server that may be remote to the client.

In some examples, logic flow 1000 at block 1004 may connect to the remote client via the NW communication link using the one or more parameters. For example, connect module 922-2 may use the one parameters included in parameters 905 to connect to the remote client. The one or more parameters may include information to facilitate connection via the NW communication link to include an IP address for the remote client, identifier information for the server or authentication information to enable the server to authenticate the remote client.

According to some examples, logic flow 1000 at block 1006 may then establish a control path between the remote client and an NVMe controller maintained at the server. For these examples, the control path may be established using an RDMA protocol. For example, path module 922-3 may use RDMA protocol information 924-b having information to facilitate the establishment of a control path between the NVMe controller and the remote client using such protocols as iWARP, Infiniband or RoCE.

In some examples, logic flow 1000 at block 1008 may forward one or more properties for a storage device controlled by the NVMe controller to the remote client and send an RDMA STag generated by the NVMe controller that represents an allocated portion of the storage device that is accessible using the RDMA STag. For theses example, the allocated portion may include an OS kernel and one or more device drivers. For example, forward module 922-4 may forward properties 910 and RDMA STag 915 to the remote client.

According to some examples, logic flow 10000 at block 1010 may receive the RDMA STag from the remote client and may forward the RDMA STag to the NVMe controller to enable the remote client to access the storage device and load the OS kernel and the one or more device drivers to remotely boot the remote client. For example, receive module 922-5 may receive RDMA STag 915 and then forward RDMA STag 915 to the NVMe controller to enable the remote client to access the storage device controlled by the NVMe controller.

FIG. 11 illustrates an example of a second storage medium. As shown in FIG. 11, the second storage medium includes storage medium 1100. Storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

FIG. 12 illustrates an example NW I/O device 1200. In some examples, as shown in FIG. 12, NW I/O device 1200 may include a processing component 1240, other platform components or a communications interface 1260. According to some examples, NW I/O device 1200 may be implemented in a NW I/O device coupled to a server capable of coupling to a remote client or host device as mentioned above.

According to some examples, processing component 1240 may execute processing operations or logic for apparatus 900 and/or storage medium 1100. Processing component 1240 may include various hardware elements, software elements, or a combination of both.

In some examples, other platform components 1250 may include common computing elements, such as one or more processors, multi-core processors, co-processors, memory units, chipsets, controllers, peripherals, interfaces, oscillators, timing devices, and so forth.

In some examples, communications interface 1260 may include logic and/or features to support a communication interface. For these examples, communications interface 1260 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification, the RDMA Protocol specification, the IEEE 802-2-2008 specification, RFC 791 or RFC 793.

The components and features of NW I/O device 1200 may be implemented using any combination of discrete circuitry, application specific integrated circuits (ASICs), logic gates and/or single chip architectures. Further, the features of NW I/O device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary NW I/O device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In some examples, an example first apparatus for a network, I/O device may include circuitry. The example first apparatus may also include a parameter module for execution by the circuitry to receive one or more parameters to enable the network I/O device to connect to a remote server via a network communication link. The example first apparatus may also include a connect module for execution by the circuitry to connect to the remote server using the one or more parameters. The example first apparatus may also include a path module for execution by the circuitry to establish a control path to a (NVMe controller maintained at the remote server using an RDMA protocol. The example first apparatus may also include a receive module for execution by the circuitry to receive an RDMA STag from the NVMe controller to access an operating system (OS) kernel and one or more device drivers.

In some examples for the example first apparatus, the RDMA STag may represent an allocated portion of a storage device controlled by the NVMe controller that is accessible using the RDMA STag to access the OS kernel and the one or more device drivers.

According to some examples, the example first apparatus may also include a store module for execution by the circuitry to store the RDMA STag in a non-volatile memory at the network I/O device that is accessible to a system BIOS for a host device coupled to the network I/O device to enable the system BIOS to use the RDMA STag to access the storage device and load the OS kernel and the one or more device drivers to remotely boot the host device.

In some examples for the example first apparatus, the connect module for the example first apparatus may cede control of the connection to the remote server via the network communication link to the OS kernel or the one or more device drivers. Also, the store module may cause the RDMA STag stored in the non-volatile memory at the network I/O device to be accessible to the OS kernel or the one or more device drivers to facilitate access to the storage device by the OS kernel or the one or more device drivers via use of the RDMA STag.

According to some examples for the example first apparatus, the allocated portion of the storage device that is accessible using the RDMA STag may be jointly accessible by one or more other host devices connected to the remote server via respective separate network communication links.

In some examples, the allocated portion of the storage device that is accessible using the RDMA STag may include a first portion and a second portion. For these examples, the first portion may be read only and jointly accessible by one or more other host devices connected to the remote server via respective separate network communication links. The second portion may be read/write accessible and only accessible to the host device. According to some examples, the second portion may include information assigned to the host device and used to load the OS kernel or the one or more device drivers for execution by the circuitry at the host device.

According to some examples for the example first apparatus, the information assigned to the host device may include information to configure the host device as one or more of a database server, a file server, a mail server, a print server, a web server, an application server, a gaming server or a virtual server.

In some examples, the example first apparatus may also include a property module for execution by the circuitry to discover one or more properties for the storage device controlled by the NVMe controller. The example first apparatus may also include a register module for execution by the circuitry to register the storage device and the one or more properties with the system BIOS.

According to some examples for the example first apparatus, the one or more properties for the storage device may be identified access rights to the storage device. For these examples, the identified access rights may include read only access rights or read/write access rights.

In some examples, the example first apparatus may be capable of supporting BIOS enhanced disk driver (EDD) services to provide to the OS kernel or the one or more device drivers at least one of information to access the RDMA STag stored in the non-volatile memory. For these examples, the one or more parameters may be used to connect to the remote server or the one or more discovered properties for the storage device.

According to some examples for the example first apparatus, the system BIOS may load the OS kernel and the one or more device drivers using a BIOS interrupt call $13_{hex}$ (INT 13h) service.

In some examples for the example first apparatus, the non-volatile memory at the network I/O device comprising at least one of 3-dimensional cross-point memory, flash memory, ferroelectric memory, SONOS memory, polymer memory, nanowire, FeTRAM, FeRAM, nanowire or EEPROM.

According to some examples for the example first apparatus, the parameter module may receive the one or more parameters from a non-volatile memory maintained at the network I/O device. For these examples, the one or more parameters to include an IP address for the remote server, authentication information to authenticate a host device coupled to the network I/O device to the remote server, an identifier for the host device or network identification information for the network communication link to include a LAN identifier or a VLAN identifier.

In some examples for the example first apparatus, the parameter module may receive a first portion of the one or more parameters from a non-volatile memory maintained at the network I/O device and receive a second portion of the one or more parameters from the remote server. For these examples, the first portion may include an identifier for a host device coupled to the network I/O device or authentication information to authenticate the host device to the remote server. The second portion may include an IP address for the remote server or network identification information for the network communication link to include a LAN identifier or a VLAN identifier.

According to some examples for the example first apparatus, the RDMA protocol may include one of iWARP, Infiniband or RoCE.

In some examples, example first methods implemented at a network I/O device may include receiving one or more parameters to enable the network I/O device to connect to a remote server via a network communication link. The example first methods may also include connecting to the remote server using the one or more parameters and establishing a control path to an NVMe controller maintained at the remote server using an RDMA protocol. The example first methods may also include receiving an RDMA STag from the NVMe controller to access an OS kernel and one or more device drivers and storing the RDMA STag in a non-volatile memory at the network I/O device that is accessible to a system basic input/output system (BIOS) for a host device coupled to the network I/O device. Storing the RDMA Stag may enable the system BIOS to use the RDMA STag to access the storage device and load the OS kernel and the one or more device drivers to remotely boot the host device.

According to some examples for the example first methods, the RDMA STag may represent an allocated portion of the storage device that may be accessible using the RDMA STag to access the OS kernel and the one or more drivers.

In some examples for the example first methods, the allocated portion of the storage device that may be accessible using the RDMA STag may be jointly accessible by one or more other host devices connected to the remote server via respective separate network communication links.

According to some examples for the example first methods, the allocated portion of the storage device that may be accessible using the RDMA STag may include a first portion and a second portion. For these examples, the first portion may be read only and jointly accessible by one or more other host devices connected to the remote server via respective separate network communication links. The second portion may be read/write accessible and only accessible to the host device.

In some examples for the example first methods, the second portion may include information assigned to the host device and used to load the OS kernel or the one or more device drivers for execution by the circuitry at the host device.

According to some examples for the example first methods, the information assigned to the host device may include information to configure the host device as one or more of a database server, a file server, a mail server, a print server, a web server, an application server, a gaming server or a virtual server.

In some examples, the example first methods may also include ceding control of the connection to the remote server via the network communication link to the OS kernel or the one or more device drivers. For these examples, the RDMA STag stored in the non-volatile memory at the network I/O device may also be accessible to the OS kernel or the one or more device drivers to facilitate access to the storage device by the OS kernel or the one or more device drivers via use of the RDMA STag.

According to some examples, the example first methods may also include receiving the one or more parameters from a non-volatile memory maintained at the network I/O device. For these examples, the one or more parameters may include an IP address for the remote server, authentication information to authenticate the host device to the remote server, an identifier for the host device or network identification information for the network communication link to include LAN identifier or a VLAN identifier.

In some examples, the example first methods may also include receiving a first portion of the one or more parameters from a non-volatile memory maintained at the network I/O device and receiving a second portion of the one or more parameters from the remote server. For these examples, the first portion may include an identifier for the host device or authentication information to authenticate the host device to the remote server. The second portion may include an IP address for the remote server or network identification information for the network communication link to include a LAN identifier or a VLAN identifier.

According to some examples for the example first methods, the RDMA protocol may include one of iWARP, Infiniband or RoCE.

In some examples, the example first methods may also include discovering one or more properties for the storage device controlled by the NVMe controller and registering the storage device and the one or more properties with the system BIOS.

According to some examples for the example first methods, discovering the one or more properties for the storage device may include identifying access rights to the storage device. For these examples, the identified access rights may include read only access rights or read/write access rights.

In some examples, the example first methods may also include supporting BIOS EDD services to provide to the OS kernel or the one or more device drivers at least one of information to access the RDMA STag stored in the non-volatile memory, the one or more parameters used to connect to the remote server or the one or more discovered properties for the storage device.

According to some examples for the example first methods, the system BIOS to load the OS kernel and the one or more device drivers using a BIOS interrupt call $13_{hex}$ (INT 13h) service.

In some examples, a first at least one machine readable medium comprising a plurality of instructions that in response to being executed on a network I/O device coupled to a host device causes the network I/O device to receive one or more parameters to enable the network I/O device to connect to a remote server via a network communication link. The instructions may also cause the network I/O device to connect to the remote server using the one or more parameters and establish a control path to an NVMe controller maintained at the remote server using an RDMA protocol. The instructions may also cause the network I/O device to discover one or more properties for a storage device controlled by the NVMe controller. The instructions may also cause the network I/O device to register the storage device and the one or more properties with a system BIOS for the host device. The instructions may also cause the network I/O device to receive an RDMA STag from the NVMe controller that represents an allocated portion of the storage device that may be accessible using the RDMA STag. The allocated portion may store an OS kernel and one or more device drivers. The instructions may also cause the network I/O device to store the RDMA STag in a non-volatile memory at the network I/O device that is accessible to a system BIOS for the host device to enable the system BIOS to use the RDMA STag to access the storage device and load the OS kernel and the one or more device drivers to remotely boot the host device.

According to some examples for the first at least one machine readable medium, the instructions may also cause the network I/O device to cede control of the connection to the remote server via the network communication link to the OS kernel or the one or more device drivers. For these examples, the RDMA STag stored in the non-volatile memory at the network I/O device may also be accessible to the OS kernel or the one or more device drivers to facilitate access to the storage device by the OS kernel or the one or more device drivers via use of the RDMA STag.

In some examples for the first at least one machine readable medium, one or more parameters may be received from a non-volatile memory maintained at the network I/O device. For these examples, the one or more parameters may include an IP address for the remote server, authentication information to authenticate the host device to the remote server, an identifier for the host device or network identification information for the network communication link to include a LAN identifier or a VLAN identifier.

According to some examples for the first at least one machine readable medium, a first portion of the one or more parameters may be receive from a non-volatile memory maintained at the network I/O device and a second portion of the one or more parameters may be received from the remote server. The first portion may include an identifier for the host device or authentication information to authenticate the host device to the remote server. The second portion to include an IP address for the remote server or network identification information for the network communication link to include a LAN identifier or a VLAN identifier.

In some examples for the first at least one machine readable medium, the RDMA protocol to include one of iWARP, Infiniband or RoCE.

According to some examples for the first at least one machine readable medium, the discovered one or more properties for the storage device may include identifying access rights to the storage device, the identified access rights to include read only access rights or read/write access rights.

In some examples for the first at least one machine readable medium, the system BIOS may load the OS kernel and the one or more device drivers using a BIOS interrupt call $13_{hex}$ (INT 13h) service.

According to some examples for the first at least one machine readable medium, the instructions to also cause the network I/O device to support BIOS EDD services to provide the OS kernel or the one or more device drivers with at least one of information to access the RDMA STag stored in the non-volatile memory. For these examples, the one or more parameters may be used to connect to the remote server or the one or more discovered properties for the storage device.

In some examples for the first at least one machine readable medium, the allocated portion of the storage device that is accessible using the RDMA STag may be jointly accessible by one or more other host devices connected to the remote server via respective separate network communication links.

According to some examples for the first at least one machine readable medium, the allocated portion of the storage device that is accessible using the RDMA STag may include a first portion and a second portion. The first portion may be read only and jointly accessible by one or more other host devices connected to the remote server via respective separate network communication links. The second portion may be read/write accessible and only accessible to the host device.

In some examples for the first at least one machine readable medium, the second portion may include information assigned to the host device and used to load the OS kernel or the one or more device drivers for execution by the circuitry at the host device.

According to some examples for the first at least one machine readable medium, the information assigned to the host device may include information to configure the host device as one or more of a database server, a file server, a mail server, a print server, a web server, an application server, a gaming server or a virtual server.

In some examples, an example second apparatus for a network I/O device may include circuitry. The example second apparatus may also include a parameter module for execution by the circuitry to receive one or more parameters associated with connecting to a remote client via a network communication link. The example second apparatus may also include a connect module for execution by the circuitry to connect to the remote client via the network communication link using the one or more parameters. The example second apparatus may also include a path module for execution by the circuitry to establish a control path between the remote client and an NVMe controller maintained at a server coupled to the network I/O device, the control path established using an RDMA protocol. The example second apparatus may also include a forward module for execution by the circuitry to forward one or more properties for a storage device controlled by the NVMe controller to the remote client and to forward an RDMA service tag (STag) generated by the NVMe controller that represents an allocated portion of the storage device that is accessible using the RDMA STag. The allocated portion may include an OS kernel and one or more device drivers. The example second apparatus may also include a receive module for execution by the circuitry to receive the RDMA STag from the remote client and forward the RDMA STag to the NVMe controller to enable the remote client to access the storage device and load the OS kernel and the one or more device drivers to remotely boot the remote client.

In some examples for the example second apparatus, the one or more parameters may include an identifier for the remote client, authentication information to authenticate the remote client to the server or network identification information for the network communication link to include a LAN identifier or a VLAN identifier.

According to some examples for the example second apparatus, the parameter feature may receive a first portion of the one or more parameters from the remote client and receive a second portion of the one or more parameters from a non-volatile memory maintained at the network I/O device. The first portion may include an identifier for the remote client or authentication information to authenticate the remote client to the server. The second portion may include an IP address for the server or network identification information for the network communication link to include a LAN identifier or a VLAN identifier.

In some examples for the example second apparatus, the one or more properties for the storage device may include access rights granted to the remote client to access the storage device, the granted access rights to include read only access rights or read/write access rights According to some examples for the example second apparatus, the RDMA protocol may include one of iWARP, Infiniband or RoCE.

In some examples for the example second apparatus, the allocated portion of the storage device that may be accessible using the RDMA STag may be jointly accessible by one or more other remote clients connected to the server via respective separate network communication links.

According to some examples for the example second apparatus, the allocated portion of the storage device that may be accessible using the RDMA STag may include a first portion and a second portion. The first portion may be read only and jointly accessible by one or more other remote clients connected to the server via respective network communication links. The second portion may be read/write accessible and only accessible to the remote client.

In some examples for the example second apparatus, the second portion may include information assigned to the remote client and used to load the OS kernel or the one or more device drivers for execution by the circuitry at the remote client.

In some examples for the example second apparatus, the information assigned to the remote client may include information to configure the remote client as one or more of a database server, a file server, a mail server, a print server, a web server, an application server, a gaming server or a virtual server.

According to some examples for the example second apparatus, the storage device may include a solid state drive (SSD) having non-volatile memory comprising at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

In some examples, example second methods implemented at a network I/O device may include receiving one or more parameters associated with connecting to a remote client via a network communication link. The example second methods may also include connecting to the remote client via the network communication link using the one or more parameters and establishing a control path between the remote client and an NVMe controller maintained at a server coupled to the network I/O device. The control path may be established using an RDMA protocol. The example second methods may also include forwarding one or more properties for a storage device controlled by the NVMe controller to the remote client and sending an RDMA STag generated by the NVMe controller that represents an allocated portion of the storage device that may be accessible using the RDMA STag. The allocated portion may include an OS kernel and one or more device drivers. The example second methods may also include receiving the RDMA STag from the remote client and forwarding the RDMA STag to the NVMe controller to enable the remote client to access the storage device and load the OS kernel and the one or more device drivers to remotely boot the remote client.

According to some examples for the example second methods, the one or more parameters may include an identifier for the remote client, authentication information to authenticate the remote client to the server or network identification information for the network communication link to include a LAN identifier or a VLAN identifier.

In some examples, the example second methods may also include receiving a first portion of the one or more parameters from the remote client and receiving a second portion of the one or more parameters from a memory maintained at the server. The first portion may include an identifier for the remote client or authentication information to authenticate the remote client to the server, the second portion to include an IP address for the server or network identification information for the network communication link to include a LAN identifier or a VLAN identifier.

According to some examples for the example second methods, the one or more properties for the storage device may include access rights granted to the remote client to access the storage device, the granted access rights to include read only access rights or read/write access rights In some examples for the example second methods, the RDMA protocol may include one of iWARP, infinband or RoCE.

In some examples for the example second methods, the allocated portion of the storage device that is accessible using the RDMA STag may be jointly accessible by one or more other remote clients connected to the server via respective separate network communication links.

According to some examples for the example second methods, the allocated portion of the storage device that may be accessible using the RDMA STag may include a first portion and a second portion. For these examples, the first portion may be read only and jointly accessible by one or more other remote clients connected to the server via respective network communication links. The second portion may be read/write accessible and only accessible to the remote client.

In some examples for the example second methods, the second portion may include information assigned to the remote client and used to load the OS kernel or the one or more device drivers for execution by the circuitry at the remote client.

According to some examples for the example second methods, the information assigned to the remote client may include information to configure the remote client as one or more of a database server, a file server, a mail server, a print server, a web server, an application server, a gaming server or a virtual server.

In some examples for the example second methods, the storage device may include an SSD having non-volatile memory comprising at least one of 3-dimensional cross-point memory, flash memory, SONOS memory, polymer memory, nanowire, FeTRAM, FeRAM, nanowire or EEPROM.

In some examples, a second at least one machine readable medium comprising a plurality of instructions that in response to being executed on a network I/O device coupled to a server causes the network I/O device to receive one or more parameters associated with connecting to a remote client via a network communication link. The instructions to also cause the network I/O to connect to the remote client via the network communication link using the one or more parameters. The instructions to also cause the network I/O to establish a control path between the remote client and an NVMe controller maintained at the server, the control path established using an RDMA protocol. The instructions to also cause the network I/O to forward one or more properties for a storage device controlled by the NVMe controller to the remote client and send an RDMA STag generated by the NVMe controller that represents an allocated portion of the storage device that may be accessible using the RDMA STag. The allocated portion may include an OS kernel and one or more device drivers. The instructions to also cause the network I/O to receive the RDMA STag from the remote client and forwarding the RDMA STag to the NVMe controller to enable the remote client to access the storage device and load the OS kernel and the one or more device drivers to remotely boot the remote client.

According to some examples for the second at least one machine readable medium, the RDMA protocol may include one of iWARP, Infiniband or RoCE.

In some examples for the second at least one machine readable medium, the allocated portion of the storage device that may be accessible using the RDMA STag may be jointly accessible by one or more other remote clients connected to the server via respective separate network communication links.

According to some examples for the second at least one machine readable medium, the allocated portion of the storage device that may be accessible using the RDMA STag includes a first portion and a second portion. The first portion may be read only and jointly accessible by one or more other remote clients connected to the server via respective network communication links. The second portion may be read/write accessible and only accessible to the remote client.

In some examples for the second at least one machine readable medium, the second portion may include information assigned to the remote client and used to load the OS kernel or the one or more device drivers for execution by the circuitry at the remote client.

According to some examples for the second at least one machine readable medium, the information assigned to the remote client may include information to configure the remote client as one or more of a database server, a file server, a mail server, a print server, a web server, an application server, a gaming server or a virtual server.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry for a network input/output (I/O) device;
   a parameter module for execution by the circuitry to receive one or more parameters to enable the network I/O device to connect to a remote server via a network communication link;
   a connect module for execution by the circuitry to connect to the remote server using the one or more parameters;
   a path module for execution by the circuitry to establish a control path to a non-volatile memory express (NVMe) controller maintained at the remote server using a remote direct memory access (RDMA) protocol;
   a receive module for execution by the circuitry to receive an RDMA service tag (STag) from the NVMe controller to access an operating system (OS) kernel and one or more device drivers;
   a store module for execution by the circuitry to store the RDMA STag in a non-volatile memory at the network I/O device that is accessible to a system basic input/output system (BIOS) for a host device coupled to the network I/O device to enable the system BIOS to use the RDMA STag to access a storage device controlled by the NVMe controller and load the OS kernel and the one or more device drivers to remotely boot the host device;
   a property module for execution by the circuitry to discover one or more properties for the storage device controlled by the NVMe controller, the one or more properties including identified access rights to the storage device, the identified access rights to include read only access rights or read/write access rights; and
   a register module for execution by the circuitry to register the storage device and the one or more properties with the system BIOS.

2. The apparatus of claim 1, comprising the RDMA STag to represent an allocated portion of a storage device controlled by the NVMe controller that is accessible using the RDMA STag to access the OS kernel and the one or more device drivers.

3. The apparatus of claim 1, comprising:
   the connect module to cede control of the connection to the remote server via the network communication link to the OS kernel or the one or more device drivers; and
   the store module to cause the RDMA STag stored in the non-volatile memory at the network I/O device to be accessible to the OS kernel or the one or more device drivers to facilitate access to the storage device by the OS kernel or the one or more device drivers via use of the RDMA STag.

4. The apparatus of claim 1, the non-volatile memory at the network I/O device comprising at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

5. The apparatus of claim 1, comprising the RDMA protocol to include one of internet wide area RDMA protocol (iWARP), Infiniband or RDMA over converged Ethernet (RoCE).

6. A method comprising:
   receiving, at a network input/output (I/O) device, one or more parameters to enable the network I/O device to connect to a remote server via a network communication link;
   connecting to the remote server using the one or more parameters;
   establishing a control path to a non-volatile memory express (NVMe) controller maintained at the remote server using a remote direct memory access (RDMA) protocol;
   receiving an RDMA service tag (STag) from the NVMe controller to access an operating system (OS) kernel and one or more device drivers;
   storing the RDMA STag in a non-volatile memory at the network I/O device that is accessible to a system basic input/output system (BIOS) for a host device coupled to the network I/O device to enable the system BIOS to use the RDMA STag to access a storage device controlled by the NVMe controller and load the OS kernel and the one or more device drivers to remotely boot the host device;
   discovering one or more properties for the storage device controlled by the NVMe controller by identifying access rights to the storage device, the identified access rights to include read only access rights or read/write access rights; and
   registering the storage device and the one or more properties with the system BIOS.

7. The method of claim 6, comprising the RDMA STag to represent an allocated portion of the storage device that is accessible using the RDMA STag to access the OS kernel and the one or more drivers.

8. The method of claim 7, comprising the allocated portion of the storage device that is accessible using the RDMA STag is jointly accessible by one or more other host devices connected to the remote server via respective separate network communication links.

9. The method of claim 7, the allocated portion of the storage device that is accessible using the RDMA STag comprising a first portion and a second portion, the first portion is read only and jointly accessible by one or more other host devices connected to the remote server via respective separate network communication links, the second portion is read/write accessible and only accessible to the host device.

10. The method of claim 9, comprising the second portion to include information assigned to the host device and used to load the OS kernel or the one or more device drivers for execution by the circuitry at the host device.

11. The method of claim 10, comprising the information assigned to the host device to include information to configure the host device as one or more of a database server, a file server, a mail server, a print server, a web server, an application server, a gaming server or a virtual server.

12. The method of claim 6, comprising receiving the one or more parameters from a non-volatile memory maintained at the network I/O device, the one or more parameters to include an internet protocol (IP) address for the remote server, authentication information to authenticate the host device to the remote server, an identifier for the host device or network identification information for the network communication link to include a local access network (LAN) identifier or a virtual LAN (VLAN) identifier.

13. The method of claim 6, comprising receiving a first portion of the one or more parameters from a non-volatile memory maintained at the network I/O device and receiving a second portion of the one or more parameters from the remote server, the first portion to include an identifier for the host device or authentication information to authenticate the host device to the remote server, the second portion to include an internet protocol (IP) address for the remote server or network identification information for the network communication link to include a local access network (LAN) identifier or a virtual LAN (VLAN) identifier.

14. The method of claim 6, comprising:
supporting BIOS enhanced disk driver (EDD) services to provide to the OS kernel or the one or more device drivers at least one of information to access the RDMA STag stored in the non-volatile memory, the one or more parameters used to connect to the remote server or the one or more discovered properties for the storage device.

15. An apparatus comprising:
circuitry for a network input/output (I/O) device;
a parameter module for execution by the circuitry to receive one or more parameters associated with connecting to a remote client via a network communication link;
a connect module for execution by the circuitry to connect to the remote client via the network communication link using the one or more parameters;
a path module for execution by the circuitry to establish a control path between the remote client and a non-volatile memory express (NVMe) controller maintained at a server coupled to the network I/O device, the control path established using a remote direct memory access (RDMA) protocol;
a forward module for execution by the circuitry to forward one or more properties for a storage device controlled by the NVMe controller to the remote client and to forward an RDMA service tag (STag) generated by the NVMe controller that represents an allocated portion of the storage device that is accessible using the RDMA STag, the allocated portion to include an operating system (OS) kernel and one or more device drivers;
a receive module for execution by the circuitry to receive the RDMA STag from the remote client and forward the RDMA STag to the NVMe controller to enable the remote client to access a storage device controlled by the NVMe controller and load the OS kernel and the one or more device drivers to remotely boot the remote client;
a store module for execution by the circuitry to store the RDMA STag in a non-volatile memory at the network I/O device that is accessible to a system basic input/output system (BIOS) for a host device coupled to the network I/O device to enable the system BIOS to use the RDMA STag to access the storage device and load the OS kernel and the one or more device drivers to remotely boot the host device;
a property module for execution by the circuitry to discover one or more properties for the storage device controlled by the NVMe controller, the one or more properties including identified access rights to the storage device, the identified access rights to include read only access rights or read/write access rights; and
a register module for execution by the circuitry to register the storage device and the one or more properties with the system BIOS.

16. The apparatus of claim 15, the one or more parameters comprises an identifier for the remote client, authentication information to authenticate the remote client to the server or network identification information for the network communication link to include a local access network (LAN) identifier or a virtual LAN (VLAN) identifier.

17. The apparatus of claim 15, the storage device to include a solid state drive (SSD) having non-volatile memory comprising at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

18. At least one machine readable medium comprising a plurality of instructions that in response to being executed on a network input/output (I/O) device coupled to a server causes the network EO device to:
receive one or more parameters associated with connecting to a remote client via a network communication link;
connect to the remote client via the network communication link using the one or more parameters;
establish a control path between the remote client and a non-volatile memory express (NVMe) controller maintained at the server, the control path established using a remote direct memory access (RDMA) protocol;
forward one or more properties for a storage device controlled by the NVMe controller to the remote client and send an RDMA service tag (STag) generated by the NVMe controller that represents an allocated portion of a storage device controlled by the NVMe controller that is accessible using the RDMA STag, the allocated portion to include an operating system (OS) kernel and one or more device drivers;
receive the RDMA STag from the remote client and forwarding the RDMA STag to the NVMe controller to enable the remote client to access the storage device and load the OS kernel and the one or more device drivers to remotely boot the remote client;
a store module for execution by the circuitry to store the RDMA STag in a nonvolatile memory at the network I/O device that is accessible to a system basic input/output system (BIOS) for a host device coupled to the network I/O device to enable the system BIOS to use the RDMA STag to access the storage device and load the OS kernel and the one or more device drivers to remotely boot the host device;
a property module for execution by the circuitry to discover one or more properties for the storage device controlled by the NVMe controller, the one or more properties including identified access rights to the storage device, the identified access rights to include read only access rights or read/write access rights; and a register module for execution by the circuitry to register the storage device and the one or more properties with the system BIOS.

19. The at least one machine readable medium of claim 18, comprising the RDMA protocol to include one of internet wide area RDMA protocol (iWARP), Infiniband or RDMA over converged Ethernet (RoCE).

20. The at least one machine readable medium of claim 18, comprising the allocated portion of the storage device that is accessible using the RDMA STag is jointly accessible by one or more other remote clients connected to the server via respective separate network communication links.

* * * * *